US007317798B2

(12) United States Patent
Saito

(10) Patent No.: US 7,317,798 B2
(45) Date of Patent: Jan. 8, 2008

(54) COMMUNICATION PROCESSING SYSTEM, COMMUNICATION PROCESSING METHOD, SERVER AND COMPUTER PROGRAM

(75) Inventor: Shin Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 804 days.

(21) Appl. No.: 10/247,411

(22) Filed: Sep. 18, 2002

(65) Prior Publication Data
US 2003/0070067 A1 Apr. 10, 2003

(30) Foreign Application Priority Data
Sep. 21, 2001 (JP) .......................... P2001-288079

(51) Int. Cl.
| H04L 9/00 | (2006.01) |
| G06F 13/00 | (2006.01) |
| G06K 9/00 | (2006.01) |
| G11C 7/00 | (2006.01) |
| G06F 17/30 | (2006.01) |

(52) U.S. Cl. ...................... 380/277; 380/264; 380/278; 713/153; 713/155; 713/162; 726/18
(58) Field of Classification Search ...................... None
See application file for complete search history.

(56) References Cited

U.S. PATENT DOCUMENTS

| 6,192,130 | B1 * | 2/2001 | Otway .......................... 380/277 |
| 6,456,594 | B1 * | 9/2002 | Kaplan et al. ............... 370/238 |
| 6,477,150 | B1 * | 11/2002 | Maggenti et al. ........... 370/312 |
| 6,701,366 | B1 * | 3/2004 | Kallas et al. ............... 709/227 |
| 6,760,752 | B1 * | 7/2004 | Liu et al. .................... 709/206 |
| 6,865,681 | B2 * | 3/2005 | Nuutinen ...................... 726/14 |
| 6,918,038 | B1 * | 7/2005 | Smith et al. .................. 726/22 |

(Continued)

FOREIGN PATENT DOCUMENTS

EP 1061515 A2 * 12/2000

(Continued)

OTHER PUBLICATIONS

Ford, Warwick and Kaliski, Jr., Burton S. "Server-Assisted Generation of a Strong Secret from a Password". Proceedings from the IEEE 9th International Workshop. Jun. 2000. pp. 176-180. Found on the World Wide Web at: http://ieeexplore.ieee.org/iel5/7094/19118/00883724.pdf?tp=&arnumber=883724&isnumber=19118.*

Primary Examiner—Christopher Revak
Assistant Examiner—Jeremiah Avery
(74) Attorney, Agent, or Firm—Bell, Boyd & Lloyd LLP

(57) ABSTRACT

A communication processing system which allows a secure communication with a mobile terminal via a network. The communication processing system includes a server which provides a common key used to encrypt and decrypt data transmitted between communication terminals, and provides information about locations of communication terminals on the network. The server generates a session key and provides it to communication terminals. The server has a database in which location information of mobile terminals is stored. If the server receives, from a calling terminal, data designating a destination terminal, the server searches the database using an IP address of the destination terminal as a search key to acquire the latest location information of the destination terminal, and the server transmits encrypted data including a session key and address data of the destination terminal to the calling terminal.

25 Claims, 24 Drawing Sheets

U.S. PATENT DOCUMENTS 7,003,282 B1 * 2/2006 Ekberg ..................... 455/411
7,028,335 B1 * 4/2006 Borella et al. ................ 726/11
7,187,771 B1 * 3/2007 Dickinson et al. .......... 380/228
7,219,227 B2 * 5/2007 Hori et al. ................... 713/158

FOREIGN PATENT DOCUMENTS

JP      2001-268189      9/2001

* cited by examiner

| HOST NAME | HOME ADDRESS |
|:---:|:---:|
| aaaa | XXXX |
| bbbb | YYYY |
| cccc | ZZZZ |
| ⋮ | ⋮ |

FIG. 10

| |
|---|
| SENDER: ADDRESS OF HOME AGENT 2<br>DESTINATION: CARE-OF ADDRESS OF TERMINAL 1 |
| SENDER: ADDRESS OF TERMINAL 3<br>DESTINATION: HOME ADDRESS OF TERMINAL 1 |
| DATA |

FIG. 15

| |
|---|
| SENDER: CARE-OF ADDRESS OF TERMINAL 1<br>DESTINATION: ADDRESS OF HOME AGENT |
| \<SENDER HEADER\><br>HOME ADDRESS OF TERMINAL 1 |
| \<SENDER HEADER\><br>UPDATE |
| \<AUTHENTICATION HEADER\> |

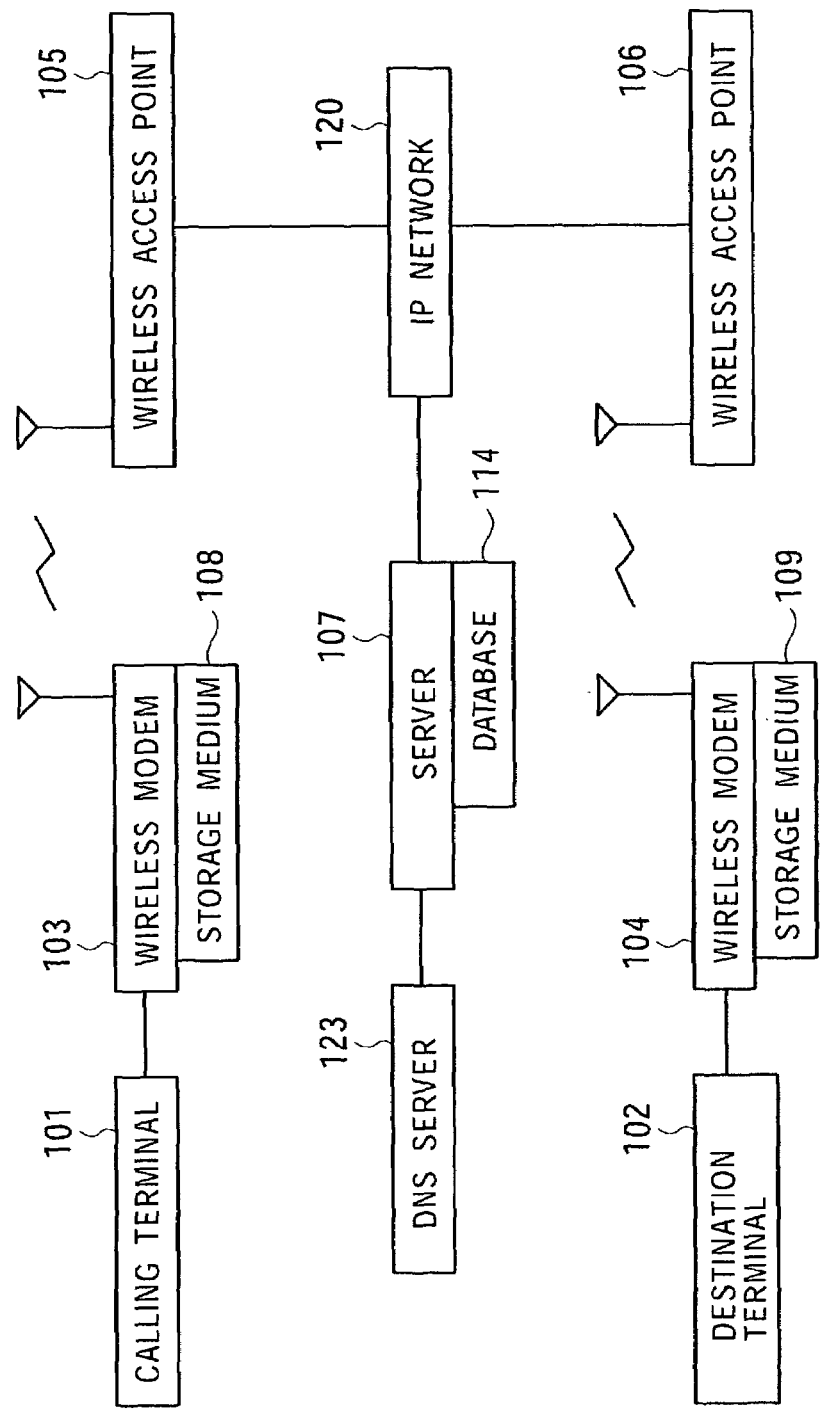

FIG. 17

| DEVICE ID | PRIVATE KEY | NUMBER OF TIMES OF KEY GENERATION | DATE/TIME | POLICY | CURRENT LOCATOR MAP |
|---|---|---|---|---|---|
| DEVICE ID OF TERMINAL (1): | PRIVATE KEY (1) OF TERMINAL (1): | NUMBER OF TIMES OF KEY GENERATION: | DATE/TIME OF USE: | INFORMATION OF POLICY (1). | CURRENT LOCATOR MAP IS DESCRIBED HEREIN |
| DEVICE ID OF TERMINAL (2): | PRIVATE KEY (2) OF TERMINAL (2): | NUMBER OF TIMES OF KEY GENERATION: | DATE/TIME OF USE: | INFORMATION OF POLICY (2): | |
| DEVICE ID OF TERMINAL (3): | PRIVATE KEY (3) OF TERMINAL (3): | NUMBER OF TIMES OF KEY GENERATION: | DATE/TIME OF USE: | INFORMATION OF POLICY (3): | |

| NETWORK PREFIX: | 2001:02xx:/35 | 2001:02yy:/35 | 2001:02zz:/35 | 2001:04/24 | 2001:06/24 |
|---|---|---|---|---|---|
| DEVICE ID OF TERMINAL (1) | CURRENT LOCATOR (1-a) | CURRENT LOCATOR (1-b) | CURRENT LOCATOR (1-c) | CURRENT LOCATOR (1-d) | ----- CURRENT LOCATOR (1-n): |
| DEVICE ID OF TERMINAL (2) | CURRENT LOCATOR (2-a) | CURRENT LOCATOR (2-b) | CURRENT LOCATOR (2-c) | CURRENT LOCATOR (2-d) | ----- CURRENT LOCATOR (2-n): |
| DEVICE ID OF TERMINAL (3) | CURRENT LOCATOR (3-a) | CURRENT LOCATOR (3-b) | CURRENT LOCATOR (3-c) | CURRENT LOCATOR (3-d) | ----- CURRENT LOCATOR (3-n): |
| DEVICE ID OF TERMINAL (4) | CURRENT LOCATOR (4-a) | CURRENT LOCATOR (4-b) | CURRENT LOCATOR (4-c) | CURRENT LOCATOR (4-d) | ----- CURRENT LOCATOR (4-n): |
| ---- | ---- | ---- | ---- | ---- | ---- |
| DEVICE ID OF TERMINAL (x) | CURRENT LOCATOR (x-a) | CURRENT LOCATOR (x-b) | CURRENT LOCATOR (x-c) | CURRENT LOCATOR (x-d) | ----- CURRENT LOCATOR (x-n): |

COMMUNICATION PROCESSING SYSTEM, COMMUNICATION PROCESSING METHOD, SERVER AND COMPUTER PROGRAM

BACKGROUND OF THE INVENTION

The present invention relates to a communication processing system, a communication processing method, a server, and a computer program. More particularly, the present invention relates to a communication processing system, a communication processing method, a server, and a computer program, which allow a secure communication between communication terminals.

The Internet has become very popular, and it is now used widely. With the increasing popularity of the Internet, communication among desktop personal computers, portable personal computers, or portable telephones, has also become popular. The Internet allows users to communicate by connecting their small-sized devices having a communication/information processing capability to a network, regardless of whether users are in or out of their offices and even regardless of whether they are moving.

In a mobile computing environment, portable terminals called nodes are assumed to move when the nodes receive service via the network which the nodes are connected to. In such a mobile computing environment, it is required that communication is continuous regardless of changes in the location of the nodes.

In the Internet, Internet Protocol ("IP") is used as a communication protocol. At present, IPv4 is one of the most popular versions of IP. In IPv4, a 32-bit address (IP address) is used to indicate an originating/destination device. In Internet communication, a 32-bit IP address, called a global IP address, is uniquely assigned to each originating/destination device such that each originating/destination device can be identified by an assigned IP address. However, as the Internet world is increasingly expanding, the IPv4 address space is becoming deficient. That is, the available number of global addresses is not large enough to satisfy current demands and/or requirements. To solve this problem, the Internet Engineering Task Force ("IETF") has proposed a new version of the IP called Internet Protocol version 6 ("IPv6") to expand the IP address space from 32 bits to 128 bits.

The IETF has also proposed a protocol called Mobile IPv6 for use in the mobile computing environment.

In Mobile IPv6, each node has two IP addresses, that is, a home address and a care-of address. With movement of a mobile node, its care-of address varies depending on which subnetwork the mobile node is currently connected to. The home address is fixed regardless of the movement of the node. Any node can communicate with a mobile node simply by designating the home address of that mobile node, regardless of the current location of the mobile node, that is, regardless of which subnetwork the mobile node is currently connected to.

The communication with a mobile node is enabled via a process performed by a home agent according to Mobile IPv6. The home agent is a node that is connected to a subnetwork corresponding to the home address of a node. When a communication node moves, the home agent receives a binding update packet including a new care-of address from the communication node, and, in response, the home agent updates a binding cache in which the correspondence between the home address (fixed) and the care-of address (varying) is stored. The home agent announces routing information corresponding to a home address of a mobile node via a network.

FIG. 1 shows a procedure of registering a care-of address. If a mobile terminal 301 serving as a mobile node moves, the mobile terminal 301 acquires a care-of address from a subnetwork to which the mobile terminal 301 is switched to. The mobile terminal (mobile node) 301 generates a binding update packet including the home address, the care-of address, and authentication data of the mobile terminal 301 and transmits it to a home agent 302.

FIG. 2 shows a format of an IPv6 header of an IPv6 packet. In the IPv6 header, as shown in FIG. 2, includes 0-bit data indicating a protocol version, 8-bit data indicating a traffic class indicating priority, 20-bit data indicating a flow label for discriminating a packet which requests a router serving as a communication relay apparatus to perform a special operation, a sender address indicating the address of a node that transmits the packet, a destination address indicating the address of a node to which the packet is transmitted, and an optional extension header.

FIG. 3 shows a format of an IPv6 address. The higher-order 64 bits of the IPv6 address are used to represent a network prefix, and the lower-order 64 bits are used to represent an interface ID that identifies a network interface of a node on a subnetwork the node is connected to. The interface ID is uniquely determined within the subnetwork. For example, a MAC address may be employed as the interface ID.

FIG. 4 shows a conventional binding update packet, which is a packet including node movement information transmitted from a mobile node to a home agent. In an IPv6 header, the care-of address of the mobile terminal 301 is described in a sender address field, and the address of the home agent is described in a destination address field.

In an extension header, the home address of the mobile terminal 301 and data indicating that the present packet is an update request message are stored in a transmission header. Furthermore, the extension header also includes an authentication header.

FIG. 5 shows a format of the authentication header. The authentication header includes an SPI (Security Parameters Index), a sequence number, and authentication data. As shown in FIG. 6, the home agent 302 detects a security association (SA) on the basis of the destination address and the SPI described in the authentication header and determines a key for use in authentication or an authentication scheme.

If the home agent 302 receives a binding update packet, the home agent 302 determines whether or not authentication data is valid. If the authentication data is determined to be valid, the home agent 302 registers, in a binding cache in the home agent 302, a care-of address included in the received binding update packet. The home agent 302 updates the binding cache in the home agent 302 and transmits a response packet to the mobile terminal 301.

Referring to FIG. 7, a procedure of transmitting a packet from a conventional terminal 303 to a moving mobile terminal 301 is described below. The conventional terminal 303 transmits data indicating the host name of the moving mobile terminal 301 to the domain name server 304 and queries the domain name server 304 for the home address of the moving terminal 301. The domain name server 304, which has data indicating the correspondence between the host name and the home address, as shown in FIG. 8, retrieves the home address of the moving mobile terminal 301 on the basis of the host name and transmits the retrieved home address to the conventional terminal 303. The conventional terminal 303 generates a packet in which the home address of the moving mobile terminal 301 is designated as the destination address, as shown in FIG. 9, and the conventional terminal 303 transmits the generated packet.

The packet transmitted from the conventional terminal 303 is delivered to the home agent 302 in accordance with the network prefix announced by the home agent 302 over the network. Upon receiving the packet transmitted from the conventional terminal 303, the home agent 302 adds an IPv6 header, in which the care-of address of the mobile terminal 301 is designated as the destination address as shown in FIG. 10, to the received packet (thereby encapsulating the received packet with the IPv6 header) and transmits it. This packet is delivered to the mobile terminal 301 in accordance with an ordinary path control scheme. Upon receiving this packet, the mobile terminal 301 removes the IPv6 header added by the home agent 302 from the received packet thereby acquiring the original packet.

The mobile terminal 301 then generates a binding update packet including the authentication header and the care-of address of the mobile terminal 301 and transmits it to the conventional terminal 303 to inform the conventional terminal 303 of the care-of address of the mobile terminal 301. If the conventional terminal 303 receives the binding update packet, the conventional terminal 303 checks the authentication data to determine whether the received data is valid. If the data is determined to be valid, the conventional terminal 303 registers the care-of address of the mobile terminal 301 in the binding cache. After completion of the registration, the conventional terminal 303 transmits an acknowledge packet to the mobile terminal 301.

As shown in FIG. 11, in the packet transmitted from the mobile terminal 301 to the conventional terminal 303, the care-of address of the mobile terminal 301 is described in the sender address field, and the home address of the mobile terminal 301 is described in the destination options header of the extension header. This packet arrives at the conventional terminal 303 via an optimum path.

Upon receiving the binding update packet, the conventional terminal 303 transmits to the mobile terminal 301 a packet including an additional routing header as shown in FIG. 12. This packet arrives at the mobile terminal 301 via an optimum path.

If the mobile terminal 301 moves, the mobile terminal 301 transmits a new care-of address to the conventional terminal 303 and the home agent 302. If the conventional terminal 303 receives the new care-of address, the conventional terminal 303, as with the home agent 302, stores the home address and the care-of address of the mobile terminal 301 into the binding cache. The mobile terminal 301 periodically transmits a binding update packet to the home agent 302 and the conventional terminal 303, and, in response, the conventional terminal 303 updates the binding cache.

The operation performed when the mobile terminal 301 moves is described below with reference to FIG. 13. The mobile terminal 301 acquires a care-of address from the subnetwork to which the mobile terminal 301 has been switched. The mobile terminal 301 generates a binding update packet including the home address of the mobile terminal 301 and other data as shown in FIG. 14 and transmits it to the conventional terminal 303. If the conventional terminal 303 receives the binding update packet, the conventional terminal 303 checks whether the authentication data included in the binding update packet is valid. If it is determined that the authentication data is valid, the conventional terminal 303 registers, in the binding cache, the care-of address of the mobile terminal 301 included in the binding update packet. After completion of the registration, the conventional terminal 303 transmits an acknowledgement packet to the terminal 301.

The mobile terminal 301 generates a binding update packet including the home address of the mobile terminal 301 as shown in FIG. 15 and transmits it to the home agent 302. If the home agent 302 receives the binding update packet, the home agent 302 checks whether the authentication data included in the binding update packet is valid. If the authentication data is determined to be valid, the home agent 302 registers, in the binding cache, the care-of address of the mobile terminal 301 included in the binding update packet. After completion of the registration, the home agent 302 transmits an acknowledge packet to the mobile terminal 301.

The applicant for the present invention has proposed a different method (LIN6) than the Mobile IPv6 described in Japanese Patent Application No. 2000-5560. In one embodiment of a method disclosed in Japanese Patent Application No. 2000-5560, an address of a mapping agent of a mobile node and a node identifier are registered in a domain name server. The mapping agent receives movement information of the mobile node and updates a current locator corresponding to the node identifier of the mobile node. The current locator is a location indicator that is updated in response to movement of the mobile node.

When a terminal wants to start a communication with a mobile node, the terminal queries the domain name server on the basis of the host name of the mobile node. In response, the domain name server informs the terminal of the address of the mapping agent and the node identifier. The terminal then transmits a query on the basis of the node identifier to the mapping agent to acquire a current locator of the node. The terminal then generates an IPv6 address of the mobile node on the basis of the acquired current locator and node identifier of the mobile node and transmits it.

In the method based on Mobile IPv6 and also in the method disclosed in Japanese Patent Application No. 2000-5560, when movement information of a node is transmitted to a home agent or a mapping agent, authentication is performed to check the validity of data.

Furthermore, in a terminal-to-terminal communication in which a destination address is acquired in the above-described manner, data transmitted in the communication often includes secret information such as private information or business/financial transaction information which should be securely concealed. In data communication via the Internet, unlike data communication via a private line, there is a possibility that data is tapped or stolen during communication. To prevent data from being stolen in an open communication network system such as the Internet so as to achieve as high security as that achieved in private communication lines, a Virtual Private Network ("VPN") technique has been proposed.

A representative example of a communication protocol for the VPN is Security Architecture for Internet Protocol ("Ipsec"). In IPsec, an encryption algorithm and key information to be used are determined between apparatuses or terminals between which communication is performed so that the information is shared between them. More specifically, in order to perform secure end-to-end communication between two communication terminals, it is required that an encryption algorithm and key information must be shared by the two communication terminals.

A example of the process of acquiring shared encryption algorithm and key information is an authentication process using public key cryptography. In the public key cryptography, a reliable third-party institution called a certificate authority (CA) issues a public key certificate including a public key. Communication terminals acquire the public key from the certificate authority. Using the acquired public key and a private key corresponding to the public key, encryption, decryption, and writing/verification of digital signature are performed. However, a problem with this technique is that both terminals have to perform high-complexity calculation, which results in a delay in transmission of information.

Another method of sharing a key is known as the Internet Key Exchange ("IKE") method, in which encryption and authentication parameters are dynamically generated and exchanged. The Kerberos method is another method of sharing a session key used in encryption of information transmitted between terminals. In the Kerberos method, a key distribution center intervenes between two terminals which are going to start communication with each other, and the key distribution center generates a key in response to a request issued by one of the two terminals and transmits the generated key to the two terminals.

To perform a secure communication with a mobile terminal in accordance with the IPsec protocol, a terminal which wants to start the communication with the mobile node first transmits a query on the basis of a host name of the mobile node to a domain name server. In response, the domain name server transmits data indicating the address of a mapping agent of the mobile node and a node identifier to the terminal. On the basis of the acquired node identifier, the terminal queries the mapping agent for a current locator of the node. The terminal generates an IPv6 address on the basis of the acquired current locator and the node identifier of the mobile node and transmits it. Furthermore, the two terminals determine an encryption algorithm and key information to be used. After completion of the complicated process described above, it becomes possible to start a secure communication between the two terminals.

To perform a secure communication with a mobile terminal via an IP network, as described above, it is needed to first acquire an address of the mobile terminal via a domain name server, a home agent, or a mapping agent, and then share information necessary for the secure communication between a calling terminal and a destination terminal. Thus, a high-complexity process is needed before starting an actual communication between the two terminals.

SUMMARY OF THE INVENTION

In view of the above-mentioned problems, it is one object of the present invention to provide a communication processing system, a communication processing method, a server, and a computer program, which make it possible to realize a communication infrastructure which allows a secure communication with a mobile terminal to be started in an efficient manner.

According to a first embodiment of the present invention, there is provided a communication processing system for performing a process that allows a communication via a network between a communication terminal serving as a calling terminal that starts a call and a communication terminal designated as a destination terminal by the calling terminal, wherein the communication processing system includes a server connected to the network, the server serving to perform a process including: acquiring location information of a mobile terminal designated as the destination terminal and storing the acquired location information in a database in relation to an identifier of the destination terminal; in response to receiving request data designating the destination terminal from the calling terminal, generating a session key serving as a common key to be used in a secure communication between the calling terminal and the destination terminal; and providing, to the calling terminal, the generated session key and address information on the basis of the location information of the destination terminal acquired from the database.

In an embodiment of the communication processing system according to the present invention, each communication terminal stores a private key, for use in encryption, in a storage medium that can be used by the communication terminal; the server stores private keys for use in encryption, identical to the private keys stored in the respective communication terminals, in the database in relation to the identifiers of the respective communication terminals; the server transmits both a first encrypted session key and a second encrypted session key to the calling terminal, the first encrypted session key being encrypted with a private key stored in relation to the calling terminal in the database, the second encrypted session key being encrypted with a private key stored in relation to the destination terminal in the database; and the calling terminal transmits, to the destination terminal, the second encrypted session key received from the server, the second encrypted session key being encrypted with the private key corresponding to the destination terminal, thereby making the session key shared by the calling terminal and the destination terminal.

In an embodiment of the communication processing system according to the present invention, each communication terminal stores a private key, for use in encryption, in a storage medium that can be used by the communication terminal; the server stores private keys for use in encryption, identical to the private keys stored in the respective communication terminals, in the database in relation to the identifiers of the respective communication terminals; and the server acquires the location information of a mobile terminal designated as the destination terminal from the database, generates address data of the destination terminal from the acquired location information, encrypts the address data using the private key stored in relation to the calling terminal in the database, and transmits the encrypted address data to the calling terminal.

In an embodiment of the communication processing system according to the present invention, the server acquires an IP address of the destination terminal in such a manner that if the server has received a name address of the destination terminal from the calling terminal, the server transfer the received name address to a domain name server (DNS), while the server acquires the IP address without querying the domain name server (DNS) for the IP address if the server has directly received the IP address of the destination terminal from the calling terminal; and the server searches the database using, as search key, the identifier of the destination terminal included in the acquired IP address to extract, from the database, current locator information serving as location information corresponding to the identifier of the destination terminal, and the server generates IP address data such that the extracted current locator information is included in the IP address data.

In an embodiment of the communication processing system according to the present invention, the location information stored in the database is data corresponding to a higher-order 64-bit network prefix address of an Ipv6 address.

In an embodiment of the communication processing system according to the present invention, the communication between the calling terminal and the server is performed on condition that authentication is successfully passed; and the server provides, to the calling terminal, the session key and the address information on the basis of the location information of the destination terminal acquired from the database, on condition that, at least, the server has successfully authenticated the calling terminal.

In an embodiment of the communication processing system according to the present invention, the server stores the number of times a session key has been generated and a date/time of generation of the session key, in the database in relation to an identifier of a communication terminal, and the server updates the data when the server generates the session key.

According to a second embodiment of the present invention, there is provided a communication processing method of performing a process that allows a communication via a network among a server, a communication terminal serving as a calling terminal that starts a call and a communication terminal designated as a destination terminal by the calling terminal, wherein the server performs a process including: acquiring location information of a mobile terminal designated as the destination terminal and storing the acquired location information in a database in relation to an identifier of the destination terminal; in response to receiving request data designating the destination terminal from the calling terminal, generating a session key serving as a common key to be used in a secure communication between the calling terminal and the destination terminal; and providing, to the calling terminal, the generated session key and address information on the basis of the location information of the destination terminal acquired from the database.

In an embodiment of the communication processing method according to the present invention, each communication terminal stores a private key, for use in encryption, in a storage medium that can be used by the communication terminal; the server stores private keys for use in encryption, identical to the private keys stored in the respective communication terminals, in the database in relation to the identifiers of the respective communication terminals; the server transmits both a first encrypted session key and a second encrypted session key to the calling terminal, the first encrypted session key being encrypted with a private key stored in relation to the calling terminal in the database, the first encrypted session key being encrypted with a private key stored in relation to the destination terminal in the database; and the calling terminal transmits, to the destination terminal, the second encrypted session key received from the server, the second encrypted session key being encrypted with the private key corresponding to the destination terminal, thereby making the session key shared by the calling terminal and the destination terminal.

In an embodiment of the communication processing method according to the present invention, each communication terminal stores a private key, for use in encryption, in a storage medium that can be used by the communication terminal; the server stores private keys for use in encryption, identical to the private keys stored in the respective communication terminals, in the database in relation to the identifiers of the respective communication terminals; and the server acquires the location information of a mobile terminal designated as the destination terminal from the database, generates address data of the destination terminal from the acquired location information, encrypts the address data using the private key stored in relation to the calling terminal in the database, and transmits the encrypted address data to the calling terminal.

In an embodiment of the communication processing method according to the present invention, the server acquires an IP address of the destination terminal in such a manner that if the server has received a name address of the destination terminal from the calling terminal, the server transfers the received name address to a domain name server (DNS) to acquire the IP address from the domain name server (DNS), while the server acquires the IP address without querying the domain name server (DNS) for the IP address if the server has directly received the IP address of the destination terminal from the calling terminal; and the server searches the database using, as search key, the identifier of the destination terminal included in the acquired IP address to extract, from the database, current locator information serving as location information corresponding to the identifier of the destination terminal, and the server generates IP address data such that the extracted current locator information is included in the IP address data.

In an embodiment of the communication processing method according to the present invention, the location information stored in the database is data corresponding to a higher-order 64-bit network prefix address of an IPv6 address.

In an embodiment of the communication processing method according to the present invention, the communication between the calling terminal and the server is performed on condition that authentication is successfully passed; and the server provides, to the calling terminal, the session key and the address information on the basis of the location information of the destination terminal acquired from the database, on condition that, at least, the server has successfully authenticated the calling terminal.

In an embodiment of the communication processing method according to the present invention, the server stores the number of times a session key has been generated and a date/time of generation of the session key, in the database in relation to an identifier of a communication terminal, and the server updates the data when the server generates the session key.

According to a third embodiment of the present invention, there is provided a server for providing a service in a communication via a network between a communication terminal serving as a calling terminal that starts a call and a communication terminal designated as a destination terminal by the calling terminal, the server serving to perform a process including: acquiring location information of a mobile terminal designated as the destination terminal and storing the acquired location information in a database in relation to an identifier of the destination terminal; in response to receiving request data designating the destination terminal from the calling terminal, generating a session key serving as a common key to be used in a secure communication between the calling terminal and the destination terminal; and providing, to the calling terminal, the generated session key and address information on the basis of the location information of the destination terminal acquired from the database.

In an embodiment of the server according to the present invention, the server stores private keys, for use in encryption, identical to those held by the respective communication terminals in the database in relation to the identifiers of the respective communication terminals; and the server transmits both a first encrypted session key and a second encrypted session key to the calling terminal, the first encrypted session key being encrypted with a private key stored in relation to the calling terminal in the database, the second encrypted session key being encrypted with a private key stored in relation to the destination terminal in the database.

In an embodiment of the server according to the present invention, the server stores private keys, for use in encryption, identical to those held by the respective communication terminals in the database in relation to the identifiers of the respective communication terminals; and the server acquires the location information of a mobile terminal designated as the destination terminal from the database, generates address data of the destination terminal from the acquired location information, encrypts the address data using the private key stored in relation to the calling terminal in the database, and transmits the encrypted address data to the calling terminal.

In an embodiment of the server according to the present invention, the server acquires an IP address of the destination terminal in such a manner that if the server has received a name address of the destination terminal from the calling terminal, the server transfer the received name address to a domain name server (DNS) to acquire the IP address from the domain name server (DNS), while the server acquires the IP address without querying the domain name server (DNS) for the IP address if the server has directly received the IP address of the destination terminal from the calling terminal; and the server searches the database using, as the search key, the identifier of the destination terminal included in the acquired IP address to extract, from the database, current locator information serving as location information corresponding to the identifier of the destination terminal, and the server generates IP address data such that the extracted current locator information is included in the IP address data.

In an embodiment of the server according to the present invention, the location information stored in the database is data corresponding to a higher-order 64-bit network prefix address of an IPv6 address.

In an embodiment of the server according to the present invention, the server provides, to the calling terminal, the session key and the address information on the basis of the location information of the destination terminal acquired from the database, on condition that, at least, the server has successfully authenticated the calling terminal.

In an embodiment of the server according to the present invention, the server stores the number of times a session key has been generated and a date/time of generation of the session key, in the database in relation to an identifier of a communication terminal, and the server updates the data when the server generates the session key.

According to a fourth embodiment of the present invention, there is provided a computer program for causing a computer system to execute a communication process between communication terminals via a network, the computer program comprising the steps of: in response to receiving request data designating a destination terminal from a calling terminal, generating a session key serving as a common key to be used in a secure communication between the calling terminal and the destination terminal; acquiring location information of a mobile terminal designated as the destination terminal from a database in which the location information is stored in relation to an identifier of the destination terminal, and generating address information of the destination terminal on the basis of the acquired location information; and transmitting the session key and the address information of the destination terminal to the calling terminal.

The computer program according to the present invention may be supplied to a general-purpose computer system capable of executing various program codes, by using a computer-readable storage medium in which the program is stored, a communication medium such as a network, a recording medium such as a CD, an FD, or an MO. By providing such a program in a computer-readable form, it becomes possible for a computer system to execute a process in accordance with the program.

It should be appreciated that the term "system" is used to describe a logical collection of a number of devices, and it is not necessarily required that the number of devices are disposed in a single case.

Additional features and advantages of the present invention are described in, that will apparent from, the following Detailed Description of the Invention and Figures.

BRIEF DESCRIPTION OF THE DRAWINGS

FIG. 10 is a diagram showing a packet transmitted from a home agent.

FIG. 15 is a diagram showing a format of a binding update packet.

FIG. 16 is a diagram showing a system according to the present invention.

FIG. 17 is a diagram showing examples of data stored in a database disposed in a server.

DETAILED DESCRIPTION OF THE INVENTION

Figure 1:
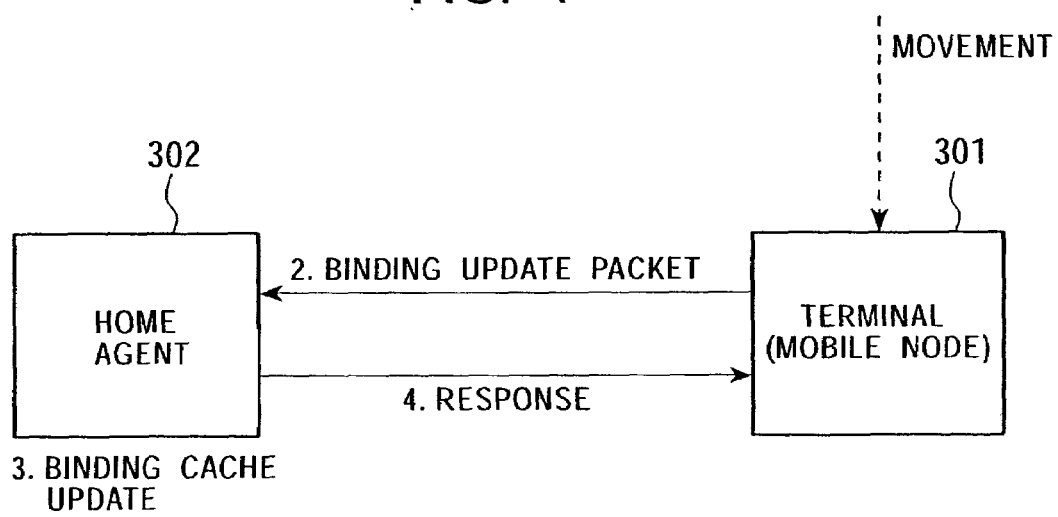
FIG. 1 is a diagram showing a procedure of registering a care-of address.
Figure 2:
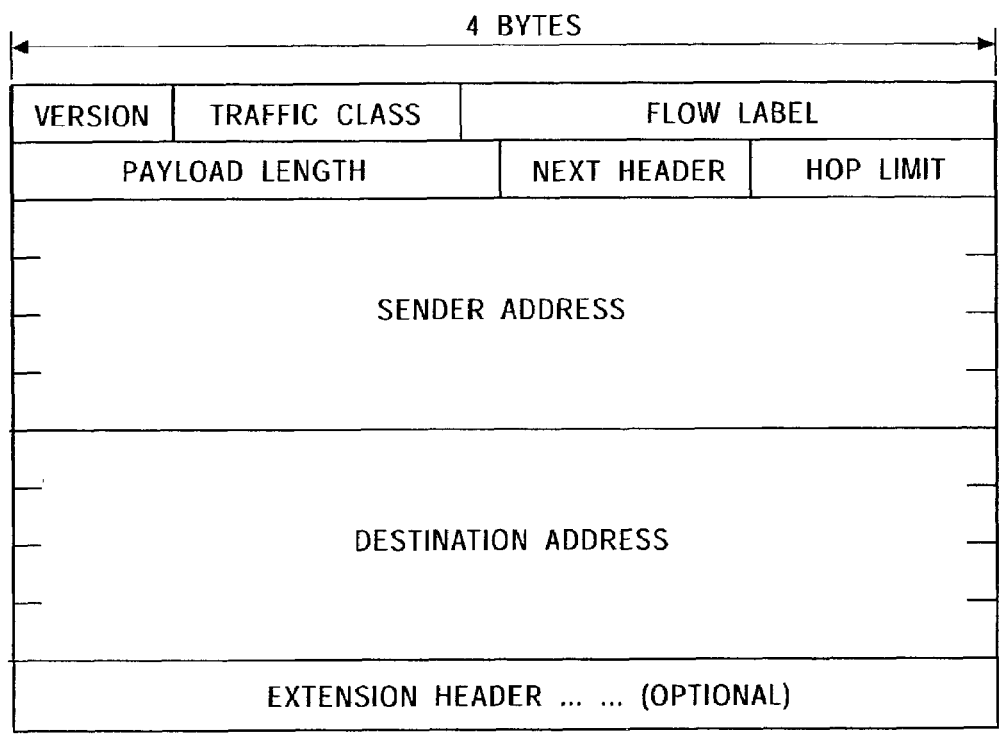
FIG. 2 is a diagram showing a format of an IPv6 header.

Embodiments of a communication processing system and a communication processing method according to the present invention are generally described below with reference to FIG. 16.

The system shown in FIG. 16 includes two terminals that communicate with each other in an end-to-end fashion, that is, a calling terminal 101 that starts communication and a terminal 102 designated as a destination terminal by the calling terminal 101. The system shown in FIG. 16 further includes a calling wireless modem 103 corresponding to the calling terminal 101, a destination wireless modem 104 corresponding to the responding terminal 102, a wireless access point 105 accessed by the calling wireless modem 103, a wireless access point 106 accessed by the destination wireless modem 104, and a server 107 for managing authentication, security, and terminal location information, wherein the wireless access points 105 and 106 and the server 107 are connected to an IP network (Internet).

The calling wireless modem 103 and the destination wireless modem 104 have storage media 108 and 109, respectively, which store globally unique identifiers (ID) assigned to the respective modems and also store private key information.

Although in FIG. 16 the calling terminal 101, the calling wireless modem 103, and the storage medium 108 are disposed separately from one another, it should be appreciated that they may be integrated into a single portable terminal system. The calling wireless modem 103 may also be provided in the form of a removable card modem, and the storage medium 108 may be a portable and removable memory such as a flash memory or a hard disk. Similarly, the responding terminal 102, the destination wireless modem 104, and the storage medium 109 may be disposed separately or integrally, and may be realized in a portable/removable form.

The server 107 has a database (storage means) 114 which stores identifiers (IDs) assigned globally uniquely to the calling wireless modem 103 and the destination wireless modem 104, respectively. In the database 114, information about private keys uniquely related to the calling wireless modem 103 and the destination wireless modem 104, respectively, is also stored. FIG. 17 shows an example of data stored in the database 104 disposed in the server 107.

As shown in FIG. 17, the database 114 stores data of private key information, the number of times a key has been generated, a date/time of generation of the key, a policy, and a current locator map, which are related to a device ID assigned to each communication terminal or wireless modem. The current locator map is data in which current locator information indicating the device location on the network is described in relation to the device ID. The current locator information is given by the higher-order 64-bit network prefix of an IPv6 address.

For a combination of private keys held by two respective terminals which want to start a communication between them, the server 107 is capable of generating session key information to be used as an encryption key in a communication session between the two terminals. The generated session key information is encrypted with private key information corresponding to the calling wireless modem and transmitted to the calling wireless modem. The generated session key information is also encrypted with private key information corresponding to the called wireless modem and transmitted to the called wireless modem.

More specifically, the server 107 acquires a globally unique identifier (ID) of a communication terminal on the basis of data received from the terminal, retrieves private key information corresponding to the acquired ID from the database 114, encrypts a session key on the basis of the retrieved private key information, and transmits the encrypted data to the terminal. The server 107 also performs authentication when data is transmitted/received to/from the communication terminal. The server 107 is also capable of performing various calculations and processes such as encryption of data, authentication, and calculation of hash values, as will be described later.

Furthermore, when the server 107 generates session key information in response to a request from a communication terminal, the server 107 increments a counter by one, reads current date/time from calendar information, and updates the data stored in the database (FIG. 17) as to the number of times of key generation and the date/time corresponding to the globally unique ID of the calling wireless modem 103.

The server 107 also stores, in the database 114, information managed by the mapping agent proposed by the applicant for the present invention in Japanese Patent Application No. 2000-5560, that is, movement information of mobile nodes, and the server 107 updates the location information of mobile nodes in response to the movement of the mobile nodes. The current locator map in the database 114 is location data of the respective terminals. That is, the current locator map is data indicating the locations on the network for the respective devices.

If the server 107 receives movement information of a mobile node, the server 107 updates the current locator corresponding to the node identifier of the mobile node. The current locator is data indicating the current location that is updated in response to the movement of the mobile node. For example, the current locator is represented by a high-order 64-bit network prefix address of an IPv6 address.

When a terminal wants to communicate with a mobile node, the terminal queries the server 107 on the basis of a host name of the mobile node. In response to the query from the terminal, the server 107 queries the domain name server (DNS) on the basis of the host name of the mobile node to acquire an address record (AAAA record in the case of IPv6) on the basis of the host name. The server 107 generates an IPv6 address of the responding terminal by combining the acquired address record with the current locator serving as data indicating the movement information of the mobile node stored in the database 114 held in the server 107, and the server 107 transmits the generated IPv6 address to the terminal wanting to communicate with the mobile node. In this process, when the information is transmitted from the server 107 to the terminal, the information is encrypted using the private key of the terminal desiring to communicate with the mobile node.

In this embodiment, when the server 107 transmits session key information to the calling terminal, the server 107 also transmits the information indicating the current location of the responding terminal after encrypting it with the private key information of the calling wireless modem 103.

The process that is performed in the system shown in FIG. 16 when a terminal-to-terminal communication is started is described in further detail below. The process includes two phases as described below:

Phase 1: In phase 1, a calling terminal 101 acquires an address of a destination terminal and session key information from the server 107.

Phase 2: In phase 2, the session key information is made shared between the calling terminal 101 and the destination terminal 102.

Each phase is described in detail below.

Figure 18:
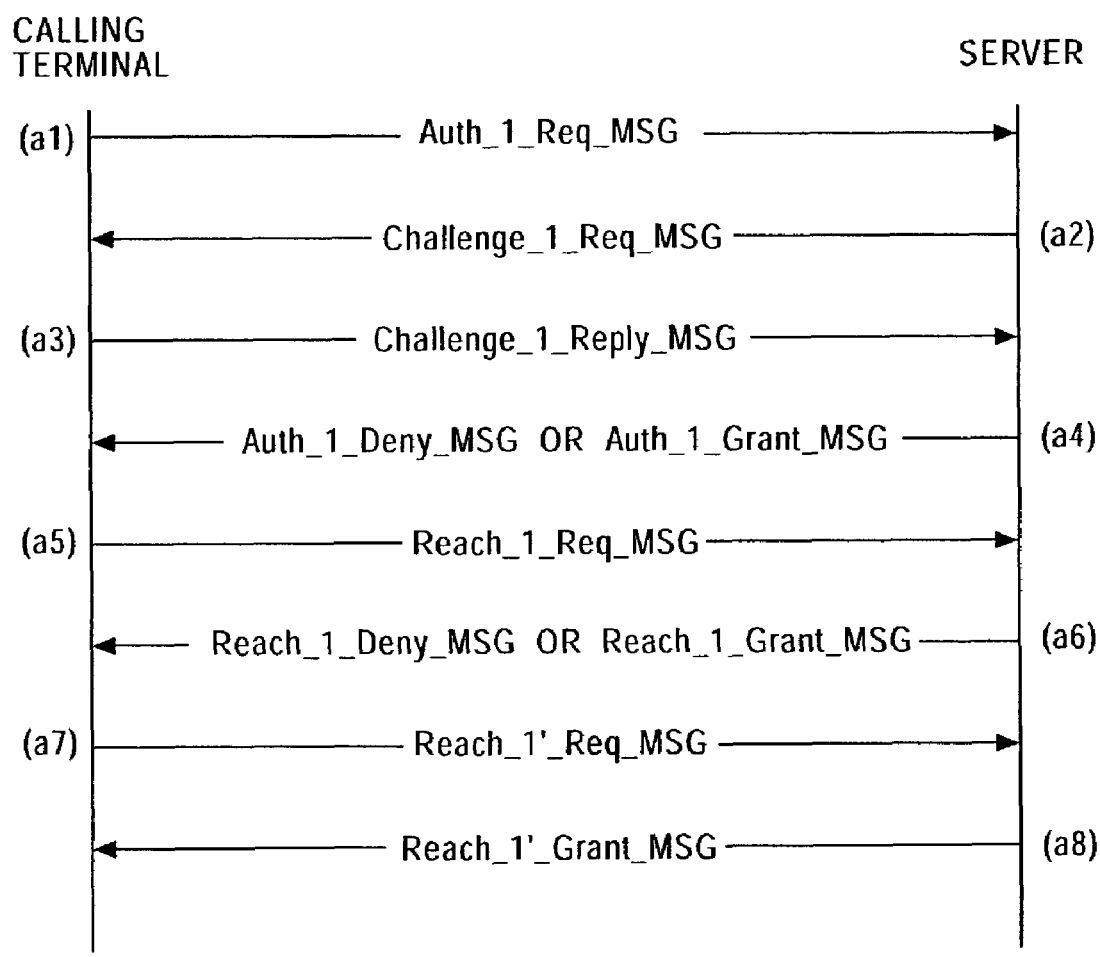
FIG. 18 is a diagram showing a sequence of processes performed between a calling terminal and a server, according to one embodiment of the present invention.

Phase 1:

With reference to a sequence diagram shown in FIG. 18, the process performed between the calling terminal 101 and the server 107 to cause the calling terminal 101 to acquire the address of the destination terminal and the session key information is described below. In FIG. 18, the calling terminal 101 is shown on the left-hand side, and the server 107 is shown on the right-hand side. The process proceeds in the order of (a1) to (a8).

Figure 3:
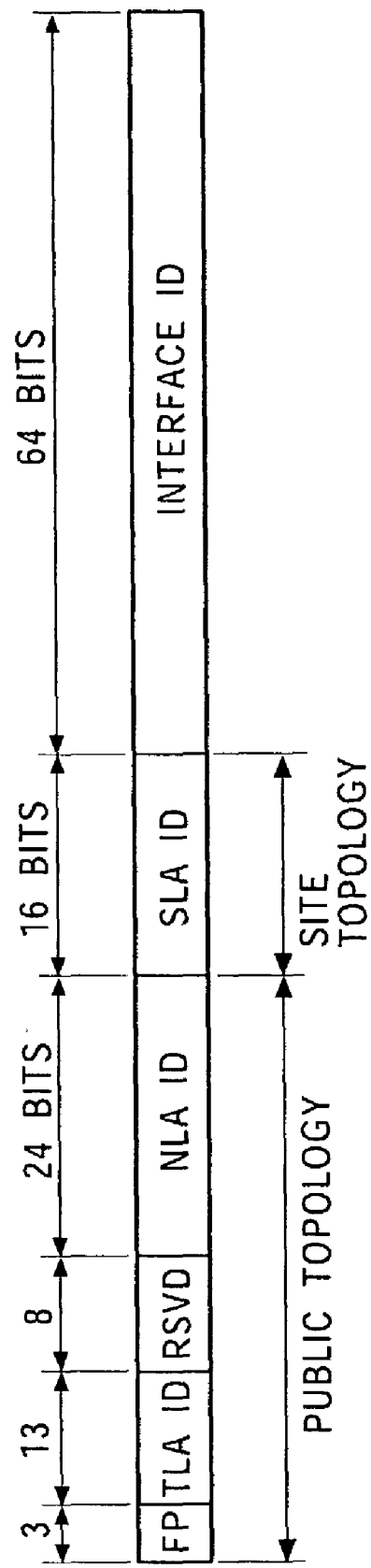
FIG. 3 is a diagram showing a format of an IPv6 address.
Figure 4:
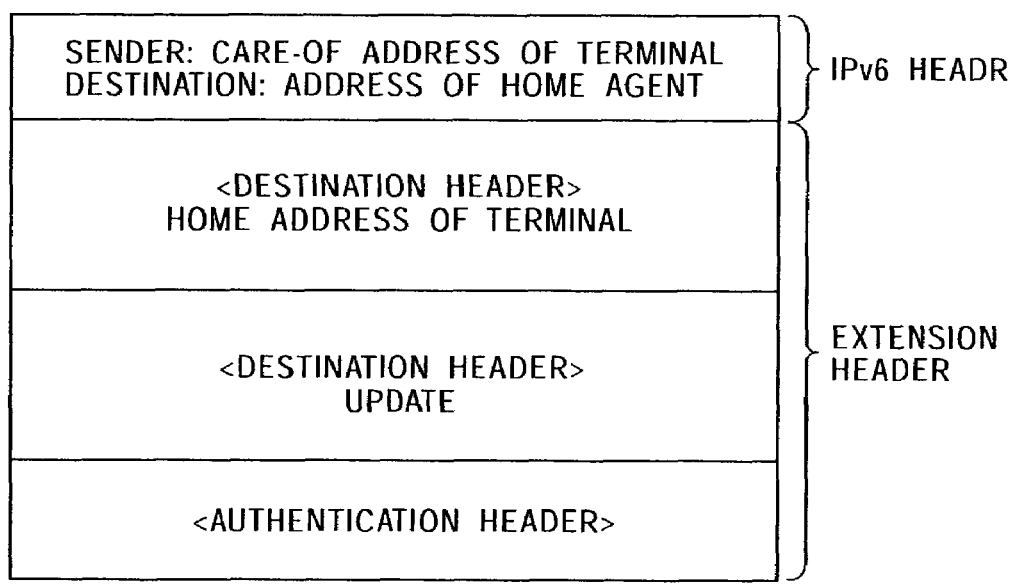
FIG. 4 is a diagram showing a conventional binding update packet.
Figure 5:
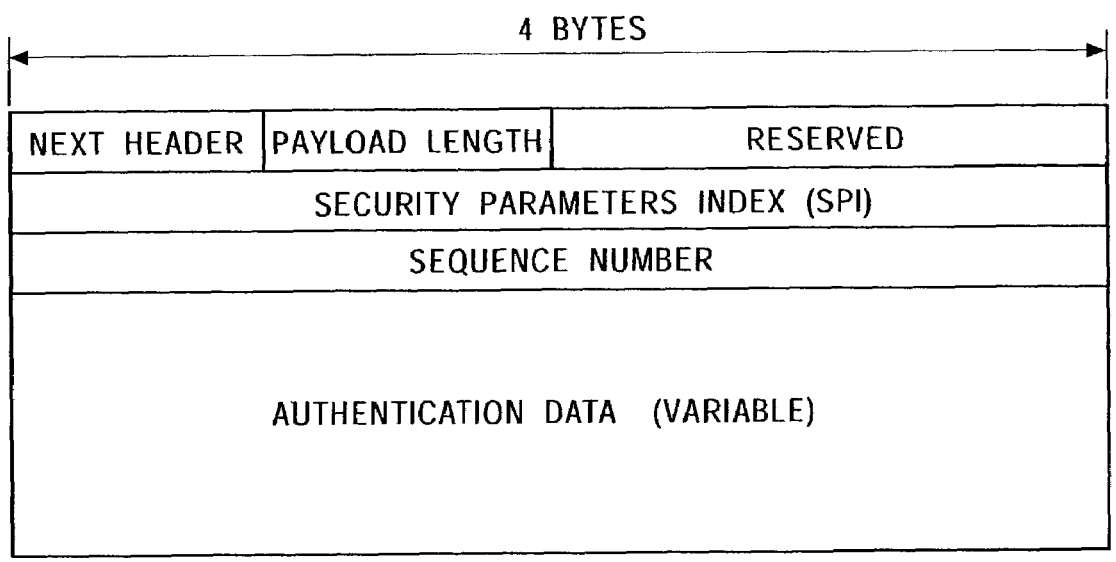
FIG. 5 is a diagram showing an authentication header.
Figure 6:
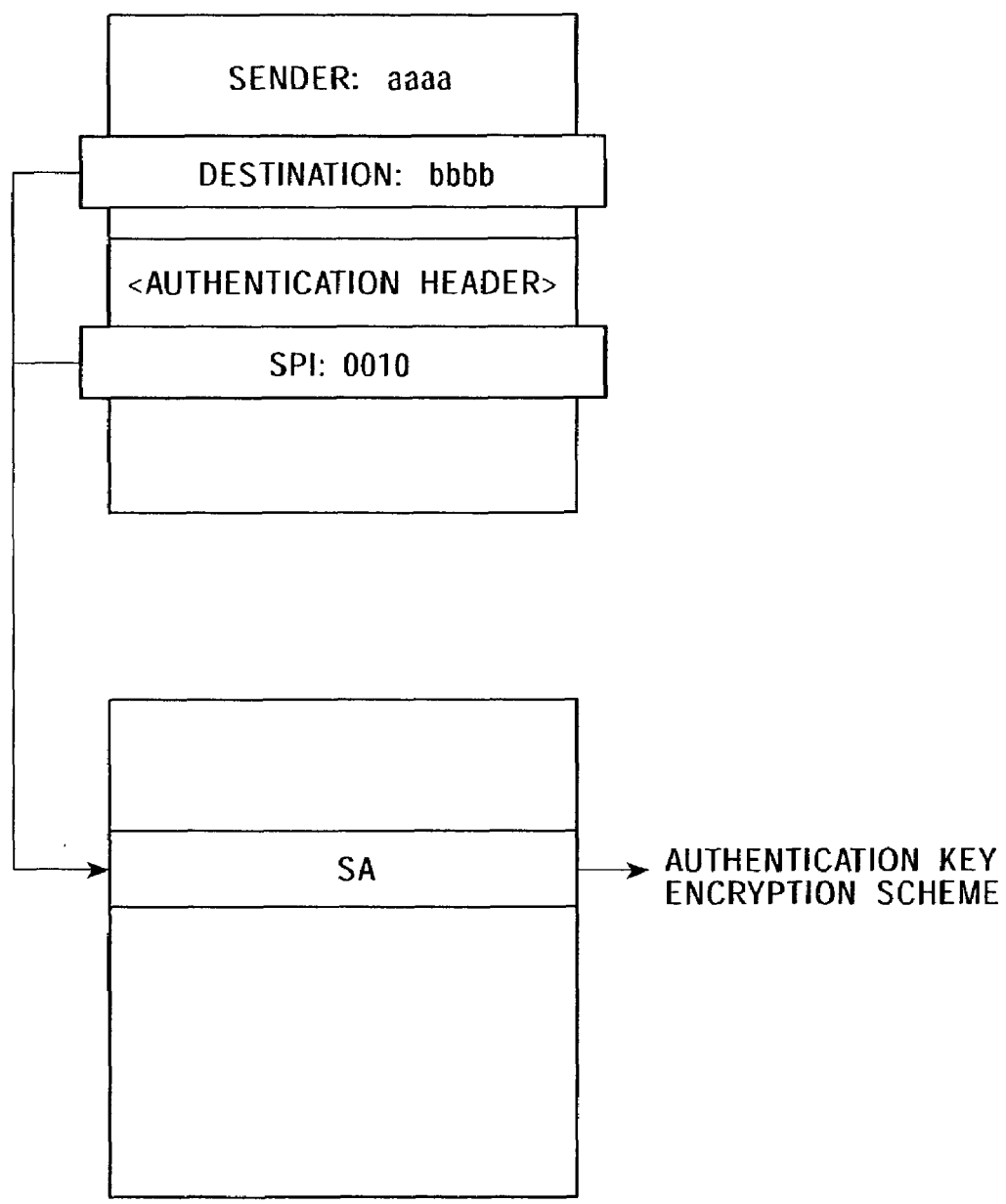
FIG. 6 is a diagram showing an outline of an authentication process.
Figure 7:
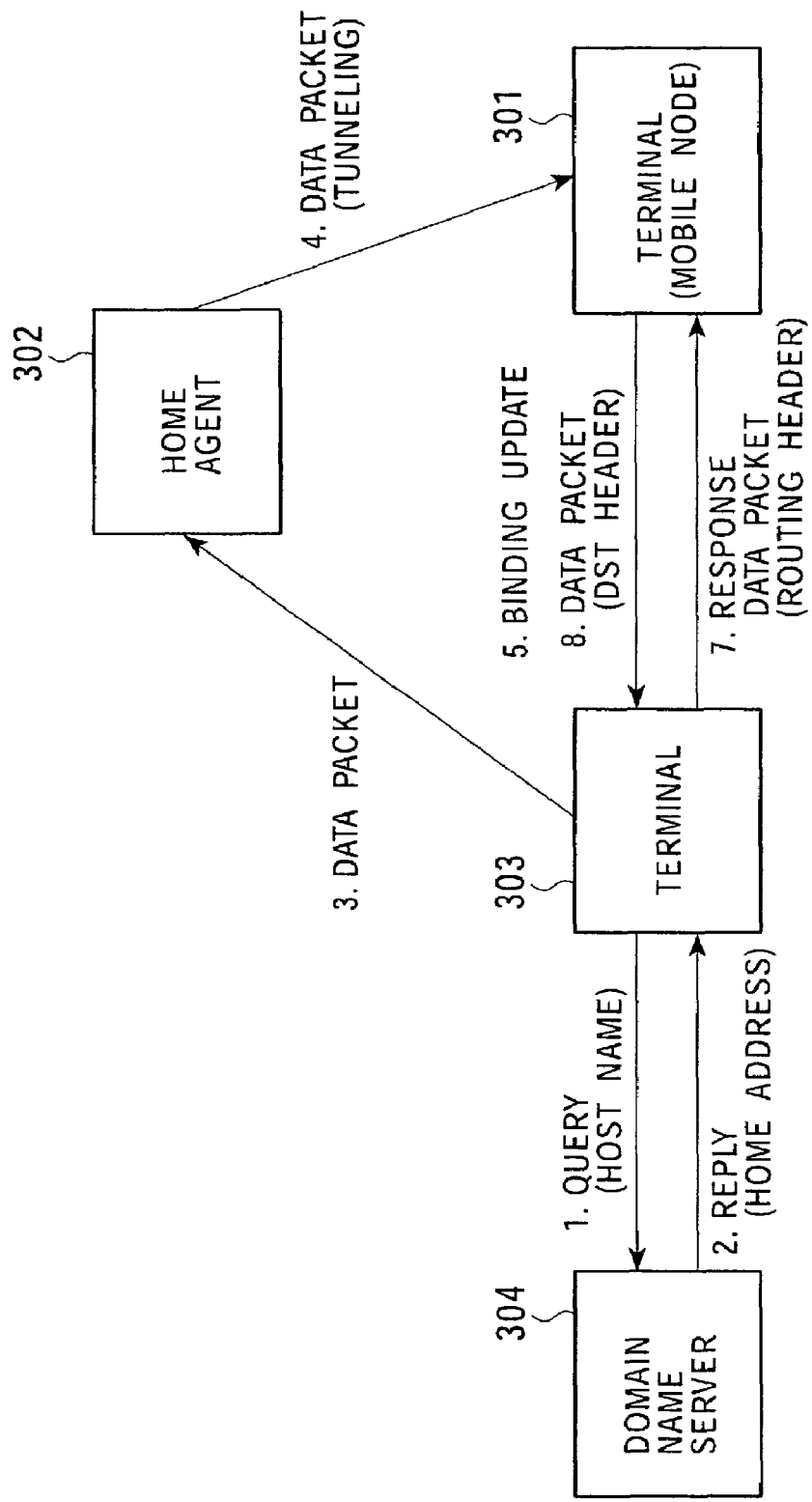
FIG. 7 is a diagram showing a procedure of transmitting a packet from a conventional terminal to a mobile terminal.
Figures 8, 9:
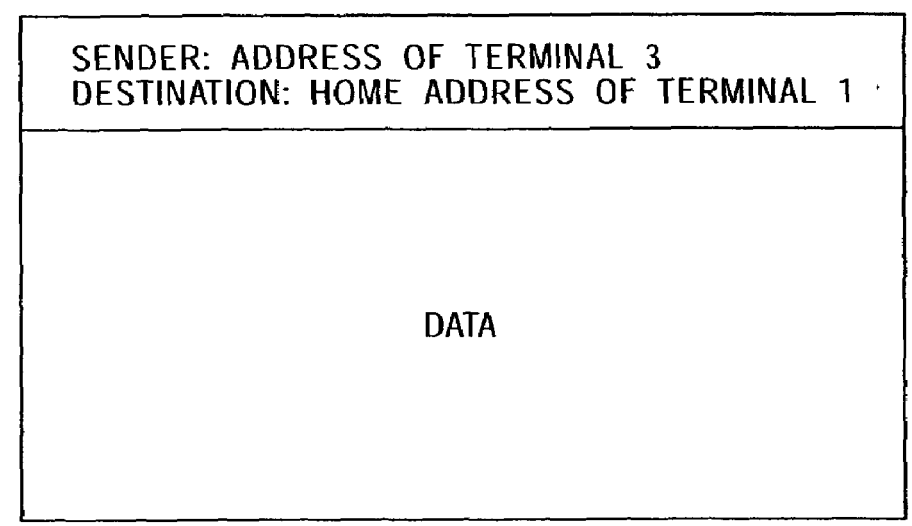
FIG. 8 is a table indicating data which is stored in a domain name server and which indicates the correspondence between host names and home addresses.
FIG. 9 is a diagram showing a format of a packet transmitted from a terminal.
Figure 11:
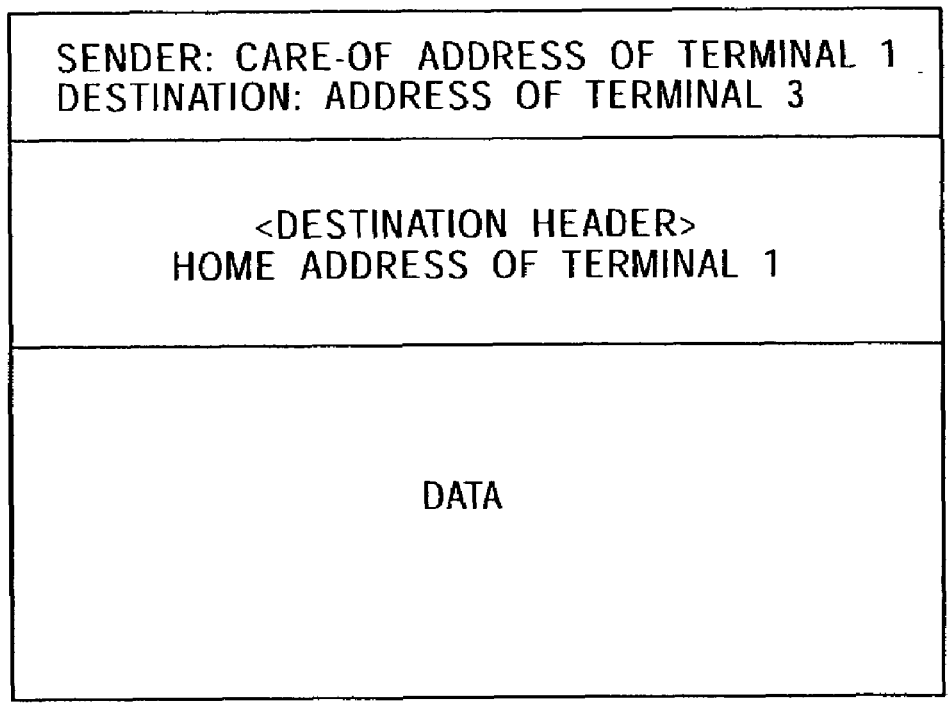
FIG. 11 is a diagram showing a format of a packet transmitted from a terminal.
Figure 12:
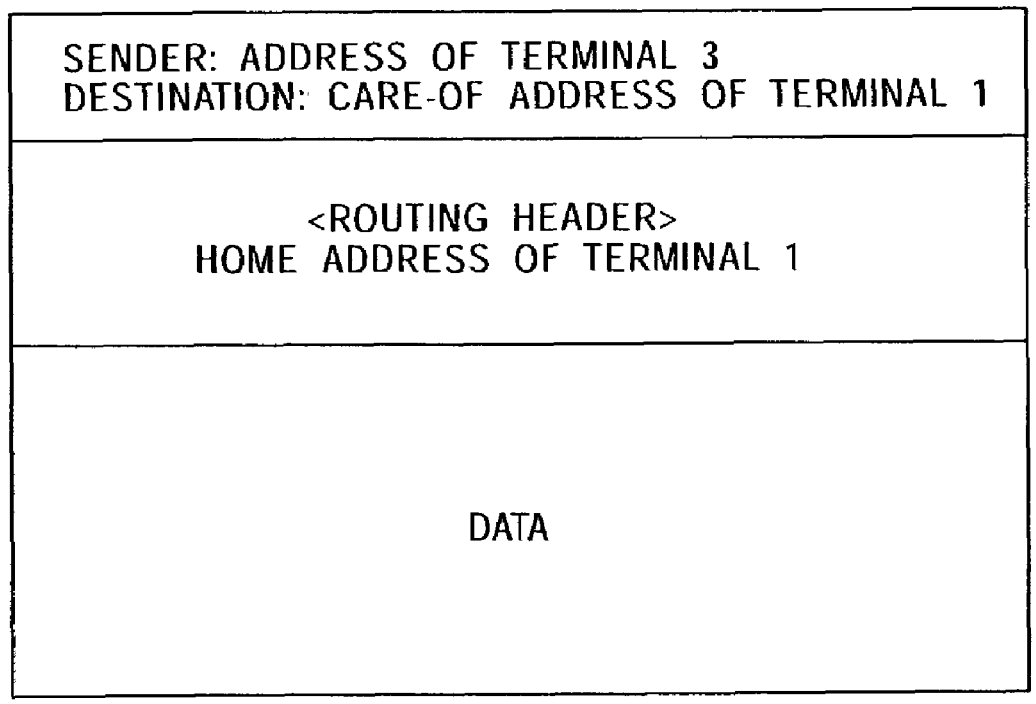
FIG. 12 is a diagram showing a routing header added to a packet transmitted from a terminal.
Figure 13:
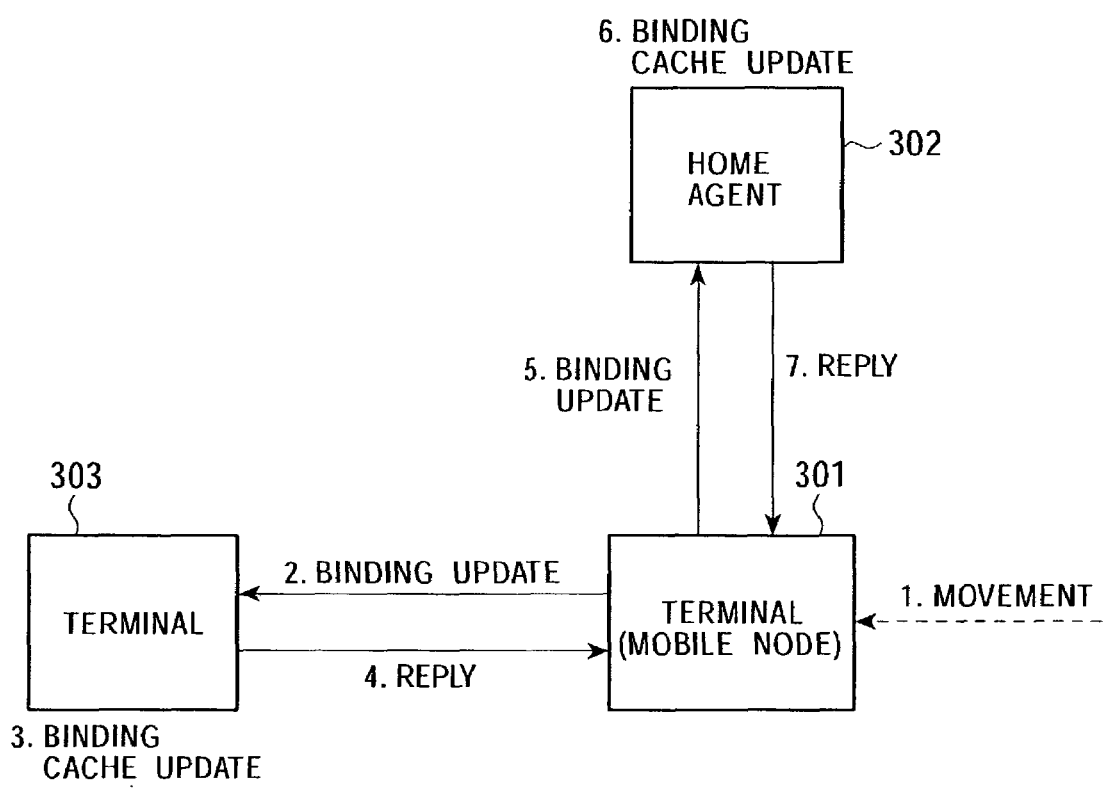
FIG. 13 is a diagram showing an operation performed when a terminal moves.
Figure 14:
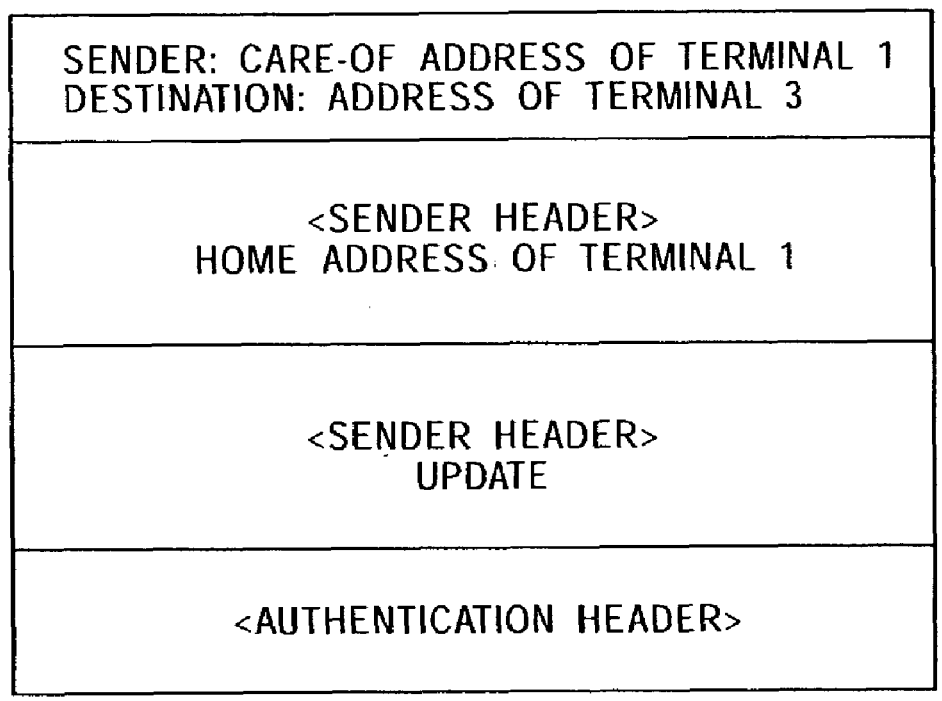
FIG. 14 is a diagram showing a format of a biding update packet.

(a1) First, the calling terminal 101 generates an IPv6 global IP address of the calling wireless modem 103 by combining the globally unique device ID of the calling wireless modem 103 with a network prefix (a higher-order 64 bits of an IPv6 address (FIG. 3)) of a network-subnet the calling terminal 101 is currently connected to via the calling wireless modem 103. The calling terminal 101 then transmits a connection authentication request (Ruth 1 Req MSG) to the server 107 via the wireless access point 105 connected to the network (IP Network). Note that the IPv6 global IP address of the calling wireless modem 103 is used herein to describe the same meaning as that represented by the IPv6 global IP address of the calling terminal 101.

(a2) The server 107 then transmits to the calling terminal 101 a message (Challenge-1 Req MSG) including a random number needed in the challenge authentication.

(a3) The calling wireless modem 103 generates a digest value in accordance with a known hash function (such as MD5) using the lower-order 64-bit value of the IPv6 address of the calling wireless modem 103, the private key information of the calling wireless modem 103, and the received random number. The calling wireless modem 103 returns a message (Challenge-1 Reply MSG) indicating the generated digest value to the server 107.

The manner of determining the hash value using the hash function is described below. The hash function is a function that compresses an input message into data with a predetermined bit length and outputs the resultant compressed message as a hash value. When a hash value (output from the hash function) is given, it is very difficult to guess a corresponding input value. If any one bit in the data input to the hash function is varied, changes occur in a large number of bits in the hash value. Furthermore, it is very difficult to find different input data which result in the same hash value. Specific examples of hash functions include MD4, MD5, and SHA-1.

(a4) The server 107 generates a digest value in accordance with the same hash function using the random number, the lower-bit 64-bit value of the IPv6 address of the calling wireless modem 103, and the private key information of the calling wireless modem 103. The server 107 compares the generated digest value with the value received from the calling terminal 101 via the calling wireless modem 103. If they are identical to each other, the authentication is determined to be successful, and the server 107 transmits to the calling terminal 101 a message (Ruth 1 Grant MSG) indicating that the authentication has been successfully passed. In a case in which the received value is not identical to the value calculated by the server 107, the authentication fails, and the server 107 transmits to the calling terminal 101 a message (Auth_1 Deny MSG) indicating that the authentication has failed, and the authentication process is performed again or terminated.

(a5) In the case in which the authentication has been successfully passed, the calling terminal 101 encrypts, using its private key, the name address (e.g., saito@aa.sony.co.jp) of the responding terminal 102 the calling terminal 101 wants to communication with, and the calling terminal 101 transmits the encrypted data (Reach 1 Req MSG) to the server 107. The private key used in this process is stored, in relation to the terminal ID, in the database 114 (FIG. 17) and is also stored in the storage medium 108 of the calling terminal 101. This private key is used in both encryption and decryption.

(a6) If the server 107 receives the name address of the responding terminal 102 the calling terminal 101 desires to communicate with, the server 107 transfers the received name address of the responding terminal 102 to the DNS (Domain Name Server) 123 and makes a query about the IP address record (more specifically, an AAAA record in the case of the IPv6 address, or an A record in the case of the IPv4 address) of the responding terminal 102.

In the case of LIN6, the IP address corresponding to the name address of the mobile node designated as the responding terminal 102 and an address of a mapping agent are registered in the DNS (Domain Name Server) 123. In the case of Mobile IP, the IP address of the responding terminal 102 is registered as a home address in the DNS (Domain Name Server) 123. The DNS (Domain Name Server) 123 transmits to the server 107 the IP address record (e.g., the AAAA record of the IPv6 address or the A record of the IPv4 address) of the responding terminal 102 to the server 107.

In the Mobile IPv6 protocol, each mobile terminal, has two IP addresses, that is, a home address and a care-of address. The care-of address varies depending on the sub-network to which the moving node is connected. On the other hand, the home address is fixed regardless of the movement of the node. The DNS (Domain Name Server) 123 has data indicating the correspondence between the name address and the home address, and the DNS (Domain Name Server) 123 informs the server 107 of the home address of the responding terminal 102. In the case of LIN6, the IP address corresponding to the name address is transmitted to the server 107.

If the server 107 acquires the home address, as the IP address, of the responding terminal 102 from the DNS (Domain Name Server) 123, the server 107 checks whether the device ID of the mobile terminal corresponding to the acquired home address is registered in the database 114 (FIG. 17). If the device ID of the mobile terminal is found in the database 114, the server 107 extracts, from the database 114, a current locator information serving as a location identifier corresponding to the device ID. The server 107 generates an IPv6 address of the responding terminal 102 by combining the extracted current locator as the higher-order 64-bit address and the lower-order 64 bits of the IP address received from the DNS (Domain Name Server) 123. The server 107 transmits the generated IPv6 address of the responding terminal 102 to the calling terminal 101. Thus, via the above process, on the calling terminal 101 can obtain in an efficient manner the address of the responding terminal 102, in which the current location of the responding terminal 102 is reflected.

In the case in which the server 107 cannot find, in the database 114 held therein, the current locator information corresponding to the device ID of the responding terminal 102, the server 107 employs the IP address acquired from the DNS (Domain Name Server) 123 as the IP address of the responding terminal 102. In the case of Mobile IPv6, the home address is employed as the IPv6 address. More specifically, in the case where the responding terminal is a mobile terminal which is not adapted to the Mobile IPv6 protocol, the IP address acquired from the DNS is applied and data communication is possible on the basis of the IPv6 address thereof. However, in the case where the mobile terminal is adapted to Mobile IPv6, the data is transmitted to the home agent having data indicating the corresponding between the home address and the care-of address, and the care-of address is added thereto thereby making it possible to perform data communication.

In a case in which the server 107 has successfully acquired, from the database 114, the current locator serving as the location identifier corresponding to the device ID of the mobile terminal, the server 107 may set the network prefix for the destination terminal 102 in an alternative manner in which the higher-order 64-bit information (network prefix) of the address of the calling terminal 101 is referred to, and the network prefix of the destination terminal 102 is determined on the basis of both subnetworks the calling terminal 101 and the destination terminal 102 respectively belong to.

If the server 107 has successfully generated the address of the destination terminal 102 via the above-described process, the server 107 generates session key information used as encryption key information to be shared by the calling terminal 101 and the destination terminal 102. The generated session key information is encrypted using the private key shared by the server 107 and the calling terminal 101 and transmitted to the calling terminal 101. The private key used in this encryption is a private key which is stored in relation to the terminal ID in the database 114 (FIG. 17) and is also stored in the storage medium 108 of the calling terminal 101. This private key is used for both encryption and decryption.

In addition to the transmission of the encrypted session key information, the server 107 encrypts, using the private key, the address of the destination terminal 102 acquired in the process described above and transmits it (Reach 1 Grant MSG) to the calling terminal 101. In a case in which the device ID corresponding to the IP address of the destination terminal 102, the server 107 acquired from the DNS, is not registered in the database 114, the server 107 transmits a message (Reach-1 Deny MSG) indicating that the connection request is denied to the calling terminal 101.

(a7) If the calling terminal 101 receives, from the server 107, the data encrypted with the private key and including the address information of the destination terminal 102 and the session key information, the calling terminal 101 decrypts the encrypted data using the private key (stored in the storage medium 108) of the calling terminal 101 thereby acquiring the address information of the destination terminal 102 and the session key information.

The calling terminal 101 then transmits a message (Reach 1' Req MSG) to the server 107 to request session key information encrypted using the private key of the destination terminal 102, wherein the session key information is needed in secure transmission of the session key from the calling terminal 101 to the destination terminal 102.

(a8) The server 107 encrypts, using the private key shared by the server 107 and the destination terminal 102, the session key information that has been generated in the process described above, and the server 107 transmits the encrypted data (Reach-1'-Grant-MSG) to the calling terminal 101. The private key used in this encryption is a private key which is stored in relation to the terminal ID in the database 114 (FIG. 17) The identical private key is also stored in the storage medium 109 of the destination terminal 102. This private key is used for both encryption and decryption.

After completion of transmission of the encrypted data (Reach-1'-Grant-MSG), the server 107 increments, by one, the count indicating the number of times the key has been generated to the calling terminal 101, and updates the corresponding data (number of times of key generation shown in FIG. 17) stored in the database 114. The server 107 then refers to the calendar disposed therein to acquire a value indicating the date/time of generation of the session key information and updates the corresponding data (date/time in FIG. 17) stored in the database 114. The above-described information stored in the database is also used to manage the number of times keys are generated daily and/or monthly, and a charge to the calling terminal 101 is calculated in a communication assist infrastructure on the basis of the number of times keys are generated in accordance with the policy agreed with the communication terminal.

Figure 19:
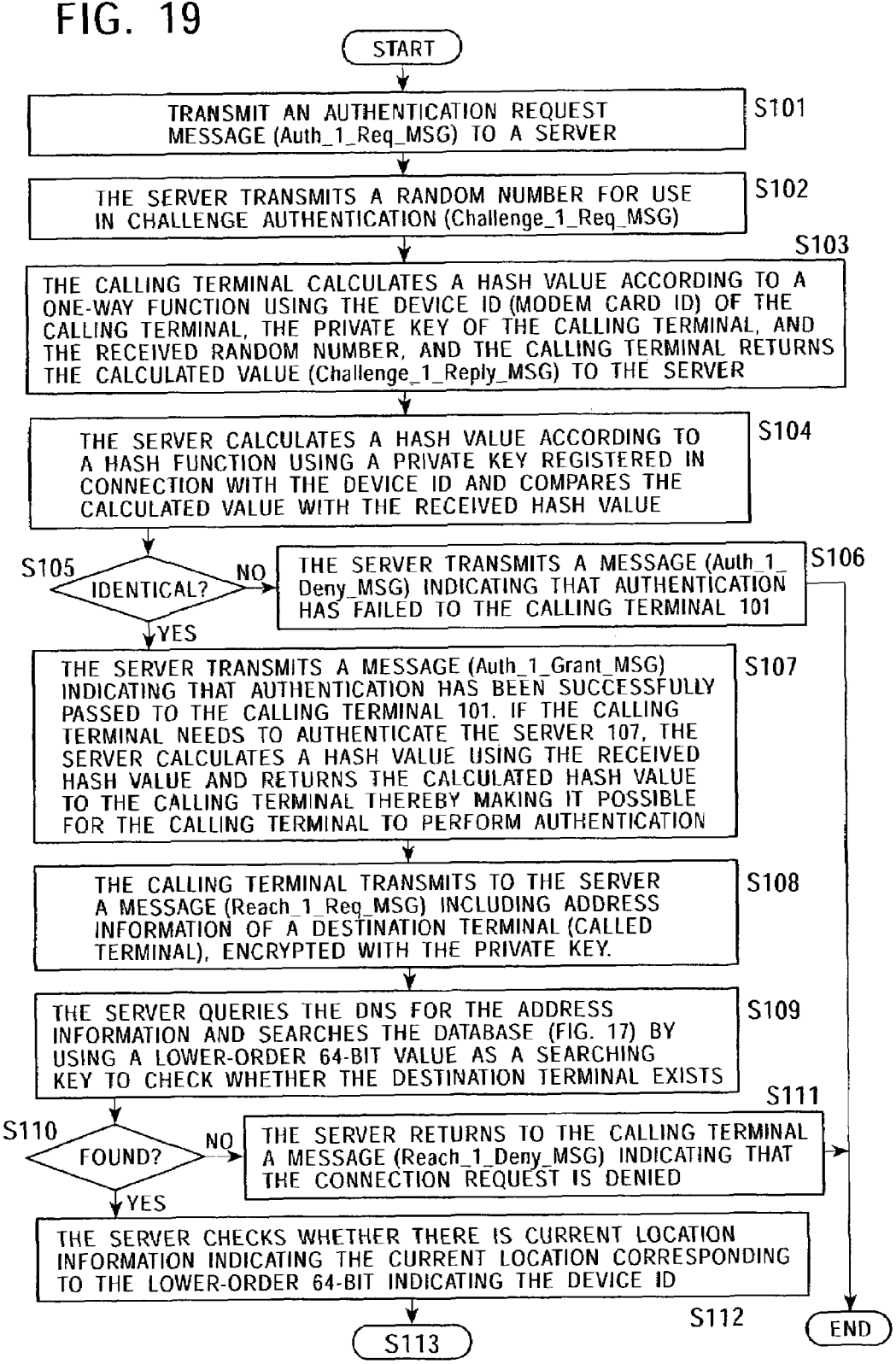
FIG. 19 is a flow chart showing a process performed between the calling terminal and the server, according to the present invention.
Figure 20:
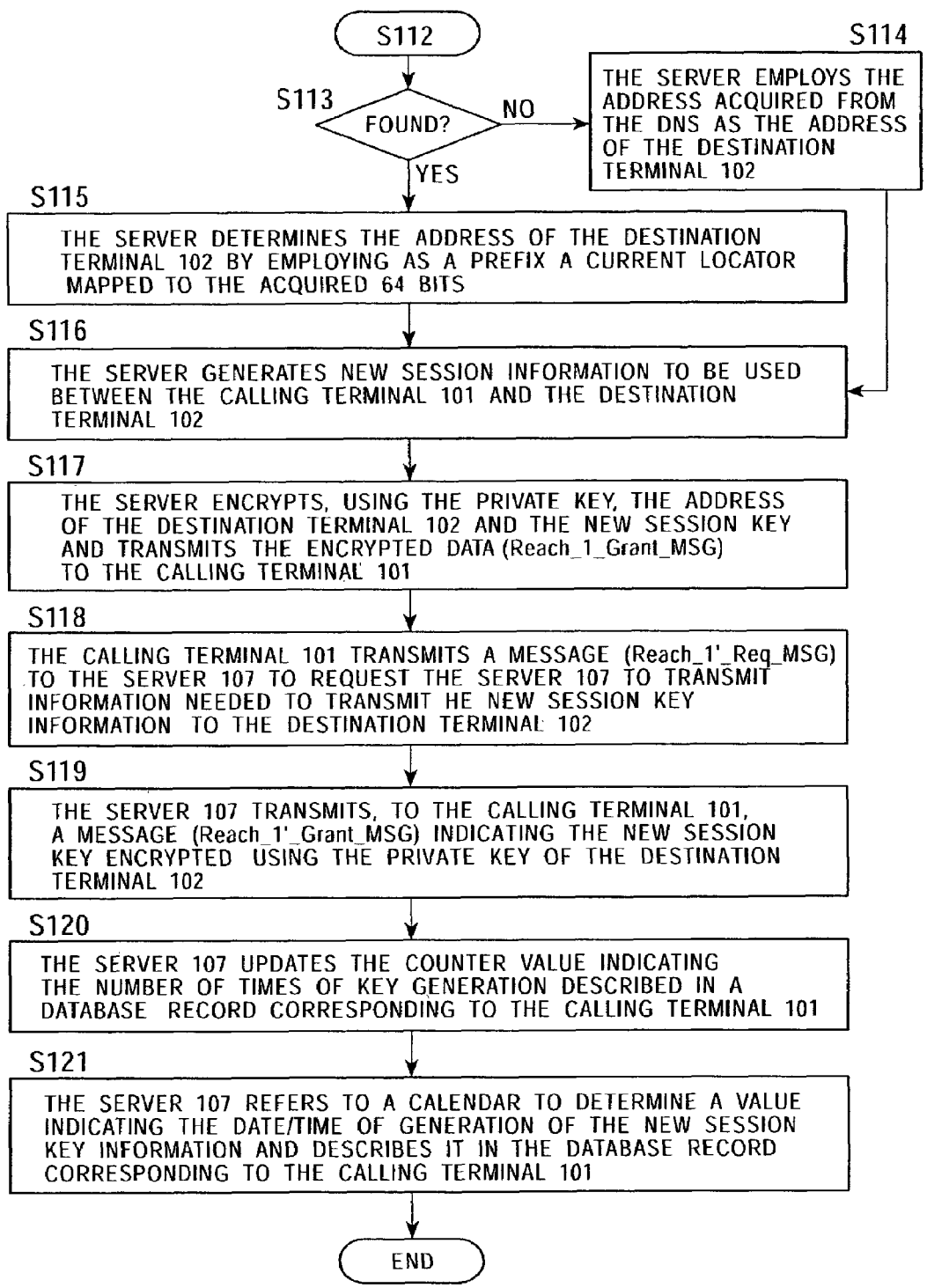
FIG. 20 is a flow chart showing a process performed between the calling terminal and the server, according to one embodiment of the present invention.

Referring to flow charts shown in FIGS. 19 and 20, the process performed between the calling terminal 101 and the server 107 is described briefly.

In step S101, the calling terminal 101 transmits an authentication request message (Auth_1 Req_MSG) to the server 107. In step S102, the server 107 transmits a message (Challenge_1 Req_MSG) including a random number needed in the challenge authentication to the calling terminal 101.

In step S103, the calling terminal 103 calculates a hash value in accordance with a one-way hash function using the device ID of the calling terminal 103 (a modem device such as a modem card), the private key stored in the storage medium 108, and the received random number. The calling terminal 103 returns the calculated hash value (Challenge-1 Reply-MSG) to the server 107.

In step S104, the server 107 retrieves, from the database 114, the private key corresponding to the device ID corresponding to the calling terminal 101. The server 107 then calculates a hash value in accordance with the one-way hash function using the device ID, the private key, and the random number, and compares the calculated hash value with the received hash value. If it is determined in step S105 that they are not identical to each other, the process proceeds to step S106, in which the server 107 transmits to the calling terminal 101 a message (Auth-1 Deny-MSG) indicating that the authentication has failed, and the server 107 terminates the process.

In the case in which it is determined in step S106 that the calculated hash value and the received hash value are identical to each other, the process proceeds to step S107. In step S107, the server 107 transmits to the calling terminal 101 a message (Auth-1 Grant-MSG) indicating the authentication has been successfully passed. If the calling device 101 needs to authenticate the authentication server 107, the server 107 generates a hash value on the basis of the received hash value and returns the generated hash value to the calling terminal 101. Upon receiving the hash value, the calling terminal 101 makes comparison of the hash value.

If the authentication has been successfully passed, the process proceeds to step S108. In step S108, the calling terminal 101 encrypts, using its private key, the name address (e.g., saito@aa.sony.co.jp) of the responding terminal 102 the calling terminal 101 desires to communicate with, and the calling terminal 101 transmits the encrypted data (Reach_1 Req-MSG) to the server 107. The private key used in this process is stored, in relation to the terminal ID, in the database 114 (FIG. 17) and is also stored in the storage medium 108 of the calling terminal 101. This private key is used in both encryption and decryption.

In step S109, the server 107 transfers, to the DNS (Domain Name Server) 123, the received name address of the responding terminal 102 the calling terminal 101 is desiring to communicate with, and makes a query about the IP address record (more specifically, an AAAA record in the case of the IPv6 address, or an A record in the case of the IPv4 address) of the responding terminal 102. If the server 107 acquires the IP address of the responding terminal 102 from the DNS 123, the server 107 checks whether the device ID of the mobile terminal corresponding to the acquired home address is registered in the database 114 (FIG. 17).

If it is determined in step S110 that the device ID of the mobile terminal is not registered, the process proceeds to step S111. In step S111, the server 107 transmits to the calling terminal 101 a message (Auth_1 Deny-MSG) indicating that the connection request has been denied.

In the case in which it is determined in step S110 that the device ID of the mobile terminal is registered, the process proceeds to step S112. In step S112, the server 107 checks whether the database 114 includes current locator information (FIG. 17) serving as the location identifier corresponding to the device ID.

In a case in which it is determined in step S113 that the database 114 does not include the current locator information corresponding to the device ID, the process proceeds to step S114. In step S114, the server 107 employs the IP address acquired from the DNS 123 as the IP address of the responding terminal 102.

In a case in which it is determined in step S113 that the database 114 includes the current locator information corresponding to the device ID, the process proceeds to step S115. In step S115, the server 107 generates an IPv6 address of the responding terminal 102 by combining the current locator, extracted from the database 114, as the higher-order 64-bit address of the IPv6 address and the lower-order 64 bits of the IP address received from the DNS 123. In the case in which the destination terminal 102 is mobile terminal adapted to a plurality of network prefixes described in the current locator map area shown in FIG. 17, the network prefix of the destination terminal 102 may be properly determined on the basis of the higher-order 64-bit information (network prefix) of the address of the calling terminal 101 and the current locator of the destination terminal 102 extracted from the database, taking into account the subnetworks the calling terminal 101 and the destination terminal 102 respectively belong to, and the IPv6 address of the destination terminal 102 may be generated by combining the determined network prefix as the higher-order 64-bit part and the lower-order 64 bits of the IP address received from the DNS (Domain Name Server) 123.

In step S116, the server 107 generates session key information used as encryption key information to be shared between the calling terminal 101 and the responding terminal 102. After generating the session key information, the server 107 encrypts, in step S117, the session key information and the address of the responding terminal 102 acquired in the above process, using the private key shared by the server 107 and the calling terminal 101. The encrypted data (Reach_1 Grant MSG) is transmitted to the calling terminal 101.

In step S118, the calling terminal 101 transmits a message (Reach-1' Req MSG) to the server 107 to request transmission of session key information encrypted with the private key information of the responding terminal 102, wherein the session key information is needed in secure transmission of the session key from the calling terminal 101 to the destination terminal 102.

In step S119, the server 107 encrypts the session key information using the private key shared by the server 107 and the responding terminal 102 and transmits the encrypted session key information (Reach-11-Grant-MSG) to the calling terminal 101. The private key used in this encryption is a private key which is stored in relation to the terminal ID in the database 114 (FIG. 17) and also in the storage medium 109 of the responding terminal 102. This private key is used for both encryption and decryption.

In step S120, the server 107 increments, by one, the count indicating the number of times the key has been generated for the calling terminal 101, and the server 107 updates the corresponding data in the database 114. In the next step S121, the server 107 refers to the calendar disposed therein to acquire a value indicating the date/time of generation of the session key information and updates the corresponding data (date/time in FIG. 17) stored in the database 114.

Via the process described above, the calling terminal 101 receives the address of the responding terminal 102 and the session key from the server 107.

Figure 21:
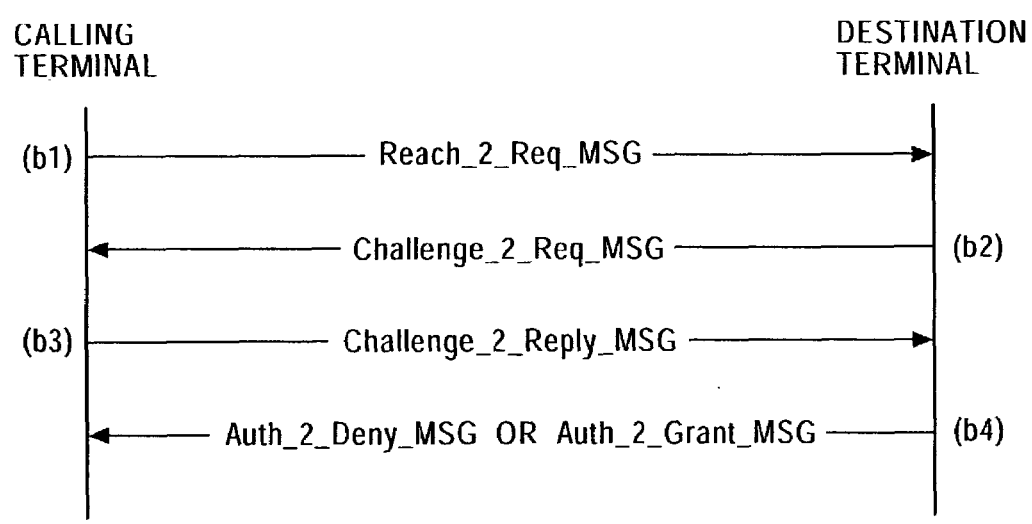
FIG. 21 is a diagram showing a sequence of processes performed between the calling terminal and a destination terminal, according to one embodiment of the present invention.

Phase 2:

Referring now to a sequence diagram shown in FIG. 21, a process performed to make the session key information shared between the calling terminal 101 and the destination terminal 102 is described below. In FIG. 21, the calling terminal 101 is shown on the left-hand side, and the responding terminal 102 is shown on the right-hand side. The process proceeds in the order of (b1) to (b4).

(b1) First, the calling terminal 101 transmits a connection request message (Reach-2 Req-MSG) to the responding terminal 102, using the IPv6 address acquired in the phase 1 described above.

(b2) If the destination terminal 102 receives the connection request message (Reach-2 Req-MSG), the destination terminal 102 generates a random number needed for the CHAP authentication (challenge response authentication) and transmits a challenge request message (Challenge-2-Req-MSG) including the generated random number to the calling terminal 101.

(b3) If the calling terminal 101 receives the challenge request message (Challenge-2-Req-MSG), the calling terminal 101 calculates a hash value in accordance with a one-way hash function for a combination of the received random number and the session key information acquired in the phase 1. Furthermore, the calling terminal 101 encrypts the calculated hash value with the session key information and transmits it together with the session key information encrypted with the private key of the destination terminal 102 acquired in phase 1 from the server 107, to the destination terminal 102 (Challenge 2 Replay MSG).

(b4) The destination terminal 102 decrypts, using the private key of the destination terminal 102 in accordance with an agreed-on decryption algorithm, the encrypted session key information included in the message received from the calling terminal 101, thereby acquiring the session key information. The encrypted session key is data that was encrypted by the server 107 in phase 1, and the private key used to encrypt the session key is a private key that is stored in relation to the terminal ID of the destination terminal in the database 114 (FIG. 17) disposed in the server 107. The identical private key is also stored in the storage medium 109 of the destination terminal 102. This private key is used for both encryption and decryption.

As for the encryption/decryption algorithm, the DES algorithm, the triple DES algorithm, or the like can be employed. In a case in which a plurality of keys are used, the plurality of keys are stored, in relation to the terminal ID of the destination terminal, in the database 114 (FIG. 17) of the server 107, and also stored in the storage medium of each terminal.

Using the session key acquired via the above decryption process, the destination terminal 102 decrypts, using the session key acquired via the above decryption process, the hash value which was encrypted by the calling terminal 101 using the session key information and which was transmitted from the calling terminal 101, thereby acquiring the hash value. Furthermore, the destination terminal 102 calculates a hash value using the random value and the session key separately acquired by the destination terminal 102, and the destination terminal 102 determines whether the decrypted hash value and the calculated hash value are identical to each other. If they are not identical to each other, the destination terminal 102 transmits to the calling terminal 101 a message (Auth-2-Denny-MSG) indicating that the authentication has failed. In the case in which both hash values are identical to each other, the destination terminal 102 transmits to the calling terminal 101 a message (Auth-2-Grant-MSG) indicating that the authentication has been successfully passed. At this stage, both the calling terminal 101 and the destination terminal 102 have acquired the session key information shared by them, and the authentication has been successfully passed, and thus it is possible to start IPsec-based secure communication.

Figure 22:
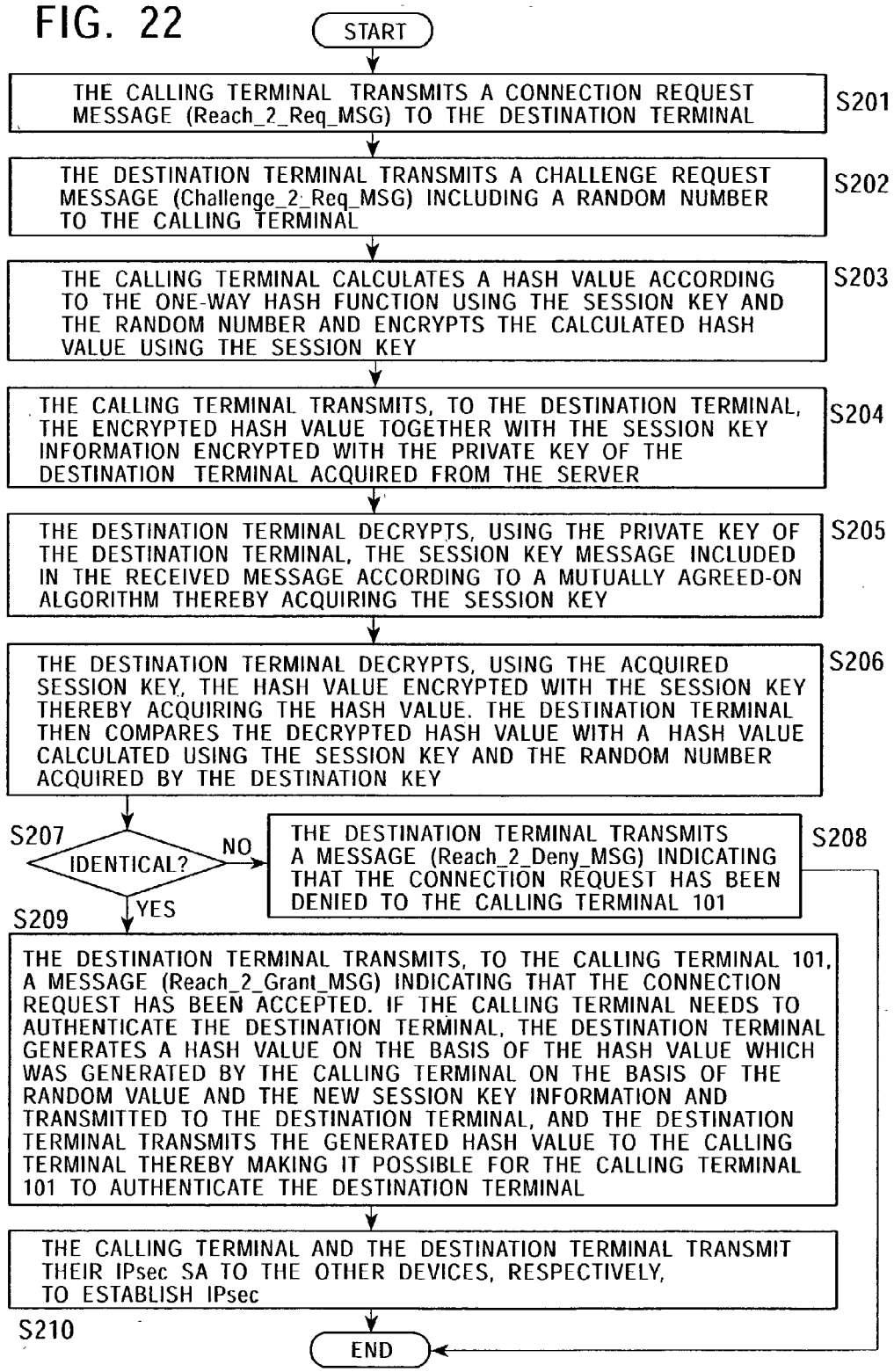
FIG. 22 is a flow chart showing a process performed between the calling terminal and the destination terminal, according to embodiment of the present invention.

FIG. 22 is a flow chart showing the process performed between the calling terminal 101 and the destination terminal 102. Referring to the flow chart shown in FIG. 22, the process performed between the calling terminal 101 and the destination terminal 102 is described below.

In step S201, the calling terminal 101 transmits a connection request message (Reach 2 Req MSG) to the responding terminal 102, using the IPv6 address acquired in the phase 1 described above.

In step S202, the destination terminal 102 generates a random number needed for the CHAP authentication (challenge response authentication) and transmits to the calling terminal 101 a challenge request message (Challenge-2-Req-MSG) including the generated random number.

In step S203, the calling terminal 101 calculates a hash value in accordance with a one-way hash function for a combination of the received random number and the session key information acquired in the phase 1. Furthermore, the calling terminal 101 encrypts the calculated hash value with the session key information.

In step S204, the calling terminal 101 transmits, to the destination terminal 102, the above encrypted session key information together with the session key information encrypted with the private key of the destination terminal 102 acquired in phase 1 from the server 107 (Challenge-2-Replay-MSG).

In step S205, the destination terminal 102 decrypts, using the private key of the destination terminal 102, the encrypted session key information included in the received message, thereby acquiring the session key information.

In the next step S206, using the session information acquired in the above decryption step, the destination terminal 102 decrypts the hash value received from the calling device 101, the hash value being encrypted with the session key, thereby acquiring the hash value. Furthermore, the destination terminal 102 calculates a hash value using the random value and the session key separately acquired by the destination terminal 102, and the destination terminal 102 determines whether the decrypted hash value and the calculated hash value are identical to each other.

If it is determined in step S207 that the two hash values are not identical to each other, the process proceeds to step S208. In step S208, a message (Auth-2-Deny-MSG) indicating that the authentication has failed is transmitted to the calling terminal 101. On the other hand, if it is determined in step S207 that the two hash values are identical to each other, the process proceeds to step S209 to transmit to the calling device 101 a message (Ruth-2-Grant-MSG) indicating that the connection request has been accepted. If the calling device 101 needs to authenticate the authentication server 107, the server 107 generates a hash value on the basis of the received hash value and returns the generated hash value to the calling terminal 101. Upon receiving the hash value, the calling terminal 101 makes comparison of the hash value.

At this stage at which the step 210 has been completed, both the calling terminal 101 and the destination terminal 102 have acquired the session key information shared by them, and the authentication has been successfully passed, and thus IPsec-based secure communication is started.

As described above, in the present invention, acquisition of an encryption key shared between the two communication terminals and acquisition of a current location, on a network, of the destination terminal can be performed at the same time, and thus it is possible to quickly start a secure communication according to the IPsec protocol, even in a case in which the destination terminal is a mobile terminal.

The location of a terminal called by a calling terminal can vary over a large number of areas or subnetworks. In this case, the server is required to store, in the database, location information of the destination terminal for respective service provider areas and mange the location information so that the server can provide address information of the destination terminal to the calling terminal, regardless of which service provider area the destination terminal is currently located in. This can be accomplished as described below.

Figure 23:
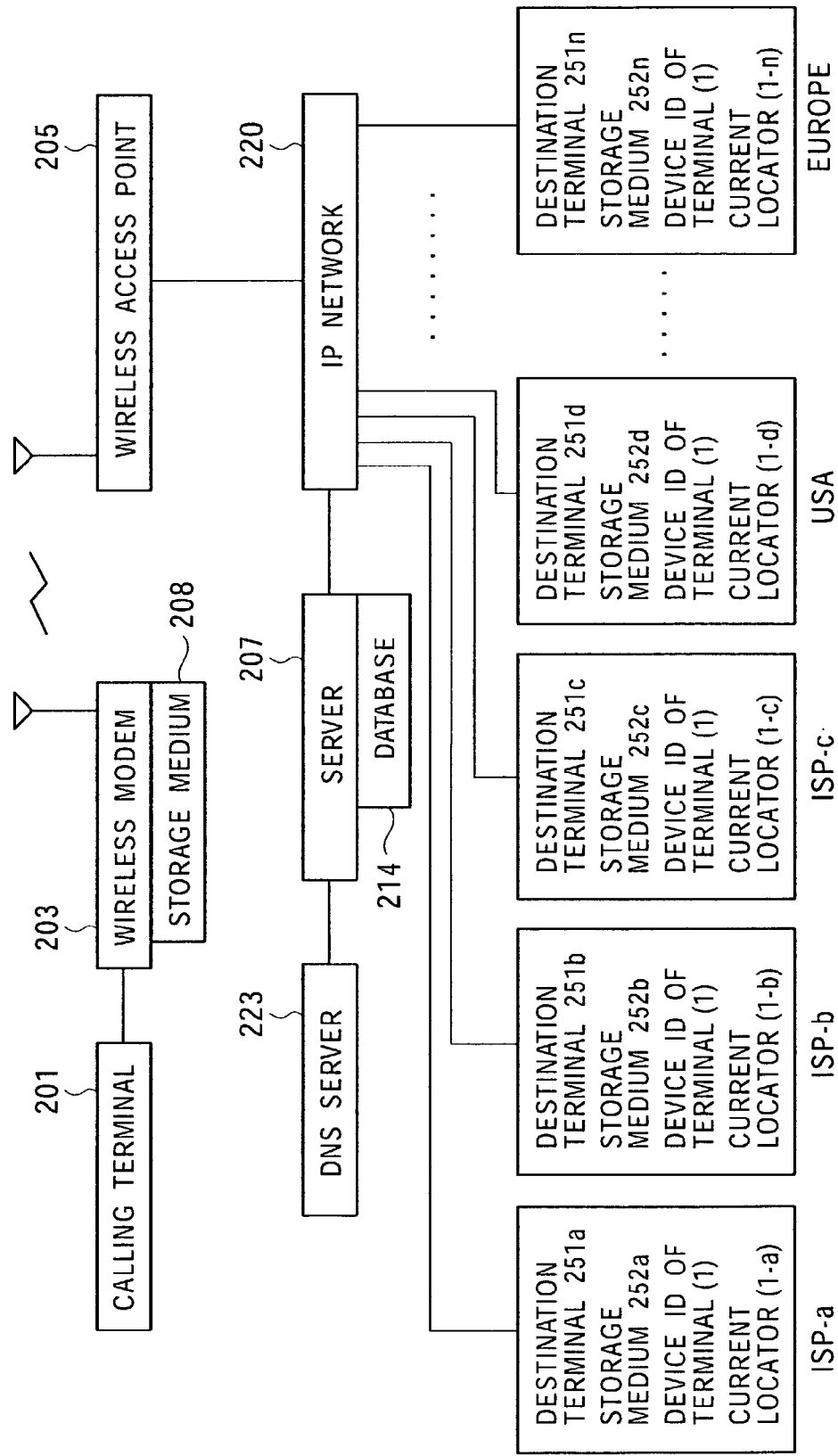
FIG. 23 is a diagram showing a system according to one embodiment of the present invention.

FIG. 23 shows a system including such a large number of service provider areas. In the example shown in FIG. 23, it is assumed that terminals (mobile terminal) having a possibility of being called by a calling terminal 201 are distributed over a plurality of service provider areas ISP-a, ISP-b, ISP-c, USA, and Europe.

A server acquires, via an IP network 220, current location information of terminals 251a to 251n located in the respective service provider areas and stores the acquired current location information in database 214. The database 214, as with the database used in the previous embodiments, stores the device ID, the private key information, the number of times of key generation, the date/time of key generation, the policy, and the current locator map for each terminal, as shown in FIG. 17. The current locator map is data in which current locator information indicating the device location on the network is described in relation to the device ID. The current locator information is given by higher-order 64-bit network prefix of an IPv6 address.

The destination terminals 251a to 251n located in the respective service provider areas ISP-a, ISP-b, ISP-c, USA, and Europe have storage media 252a to 252n, respectively, in which the corresponding device IDs and private keys identical to those stored in the database 214 of the server 207 are stored. Each of those private keys is used to encrypt a session key generated by the server 207 and to decrypt it.

For a combination of private keys held by two respective terminals which want to start a communication between them, the server 207 is capable of generating session key information to be used as an encryption key in a communication session between the two terminals. The generated session key information is encrypted with private key information corresponding to the calling wireless modem and transmitted to the calling wireless modem. The generated session key information is also encrypted with private key information corresponding to the called wireless modem and transmitted to the called wireless modem.

When a terminal wants to communicate with a mobile node, the terminal queries the server 207 on the basis of a host name of the mobile node. In response to the query from the terminal, the server 207 queries the domain name serer (DNS) 223 on the basis of the host name of the mobile node to acquire an address record (AAAA record in the case of IPv6) on the basis of the host name. The server 207 generates an IPv6 address of the responding terminal by combining the acquired address record with a current locator serving as data indicating the movement information of the mobile node stored in the database 214 held in the server 207, and the server 207 transmits the generated IPv6 address to the terminal desiring to communicate with the mobile node. In this process, when the information is transmitted from the server 207 to the terminal, the information is encrypted using the private key of the terminal desiring to communicate with the mobile node. More specifically, when the server 207 transmits session key information to the calling terminal, the server 207 also transmits the information indicating the current location of the responding terminal after encrypting it with the shared private key information.

In the system shown in FIG. 23, the server 207 collects information about all mobile terminals connected to any subnetwork and stores the information in the database, thereby making it possible for a calling terminal to receive information indicating the current location of a destination terminal together with a session key, regardless of the location of the destination terminal.

Although only one server 207 is shown in FIG. 23, a plurality of servers may be disposed such that each subnetwork includes one server dedicated to management of current locator information of terminals belonging to that subnetwork. In this case, when a server receives a request for an address of a destination terminal from a calling terminal, if the server cannot find data within its own database as to the destination terminal, the server may query another server for current locator data of the destination terminal and may transmit the acquired data to the calling terminal. This technique allows loads imposed on the servers to be distributed among the servers.

Figure 24:
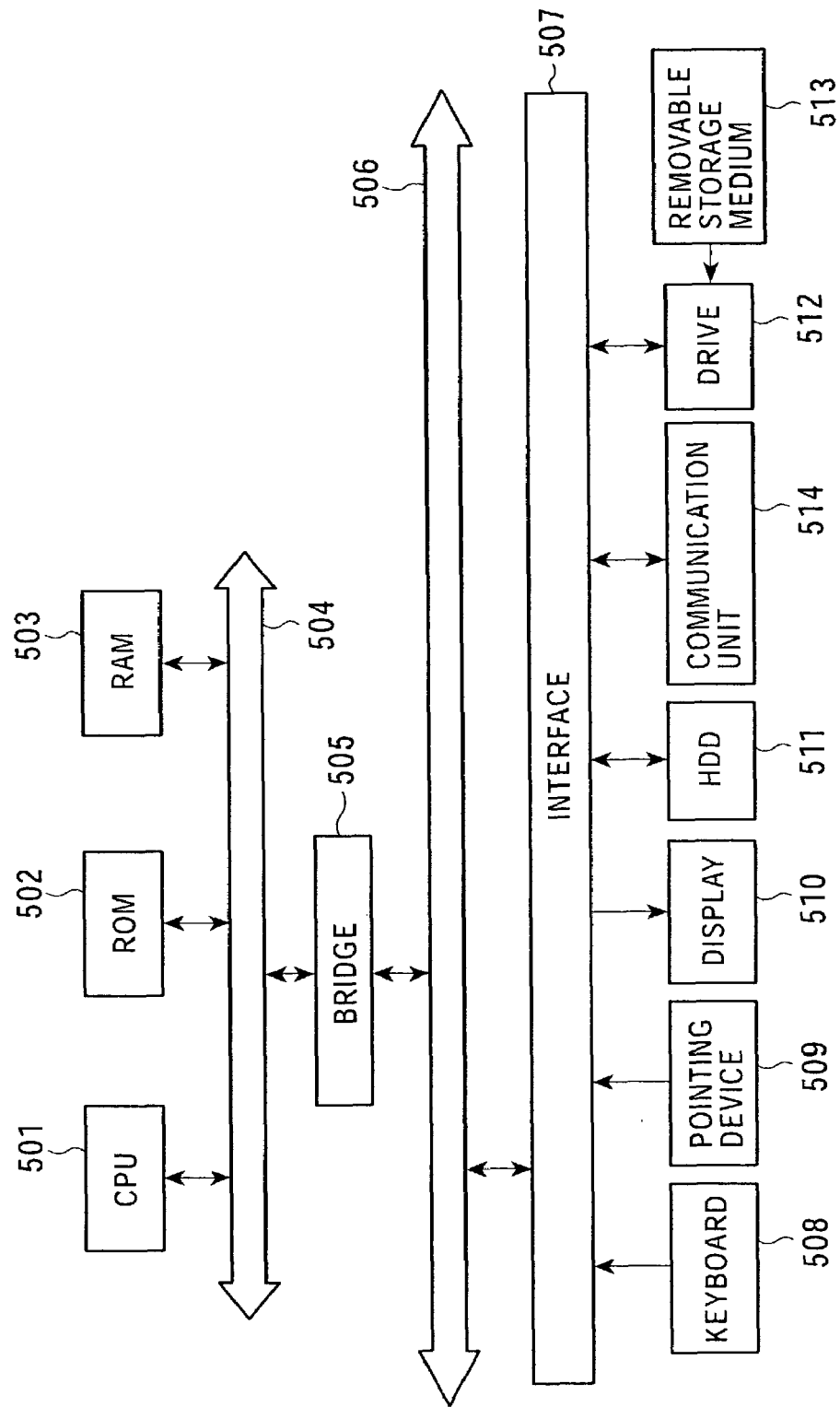
FIG. 24 is a diagram showing an example of a construction of a communication terminal according to one embodiment of the present invention.
Figure 25:
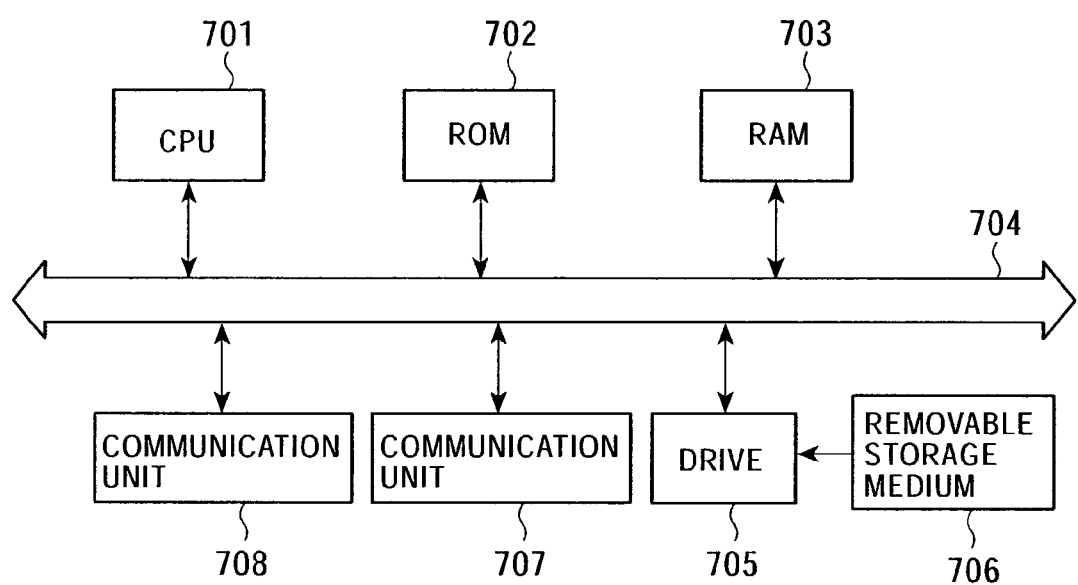
FIG. 25 is a diagram showing an example of a construction of a server according to one embodiment of the present invention.

Some examples of constructions of the communication terminal and the server used in the present system are described below with reference to FIGS. 24 and 25. FIG. 24 shows an example of a construction of the communication terminal. In this example shown in FIG. 24, the calling terminal 101, the wireless modem 103, and the storage medium 108 shown in FIG. 16 are integrated together into one communication terminal, or the destination terminal 102, and the wireless modem 104, and the storage medium 109 are integrated together.

A CPU (Central processing Unit) 501 executes an operating system (OS) and various application programs. A ROM (Read Only Memory) 502 stores a program executed by the CPU 501 and also stores data indicating fixed parameters used in computational operations. A RAM (Random Access Memory) 503 is used as a storage area or a working area, for storing a program executed by the CPU 501 and varying parameters used in the execution of the program.

A host bus 504 is connected via a bridge 505 to an external bus 506 such as a PCI (Peripheral Component Internet/Interface) bus.

A keyboard 508 is used by a user to input various commands to the CPU 501. A pointing device 509 is used by a user to point to a location on the screen of a display 510 or used to issue a command. A display 510, such as a CRT or a liquid crystal display, is used to display various kinds of information in the form of a text or an image. An HDD (Hard Disk Drive) 511 drives a hard disk serving as an information storage medium to write/read a program or data to/from the hard disk.

A drive 512 writes and reads a program or data to or from a removable storage medium 513 such as a floppy disk, a CD-ROM (Compact Disc Read Only Memory), an MO (Magnetooptical) disk, a DVD (Digital Versatile Disc), a magnetic disk, or a semiconductor memory.

In a case in which a program or data stored in a storage medium is read and executed or processed by the CPU 501, the program or data read from the storage medium is supplied, for example, to the RAM 503 connected via the interface 507, the external bus 506, the bridge 505, and the host bus 504.

The parts from the keyboard 508 to the drive 512 are connected to the interface 507, and the interface 507 is connected to the CPU 501 via the external bus 506, the bridge 505, and the host bus 504.

A communication unit 514 communicates with the server via a router or the like of a subnetwork to which the communication terminal (node) is connected, to transmit a packet of data supplied from the CPU 501 or the HDD 511 or to receive a packet via the router. A communication unit 503 is connected to the CPU 501 via the external bus 506, the bridge 505, and the host bus 504.

An example of a construction of the server for generating session keys, managing addresses, and proving information about session keys and addresses is described below with reference to FIG. 25.

A CPU (Central processing Unit) 701 executes an operating system (OS) and various application programs. A ROM (Read Only Memory) 702 stores a program executed by the CPU 701 and also stores data indicating fixed parameters used in computational operations. A RAM (Random Access Memory) 703 is used as a storage area or a working area, for storing a program executed by the CPU 701 and varying parameters used in the execution of the program.

A drive 705 writes and reads a program or data to or from a removable storage medium 706 such as a floppy disk, a CD-ROM (Compact Disc Read Only Memory), an MO (Magnetooptical) disk, a DVD (Digital Versatile Disc), a magnetic disk, or a semiconductor memory. In a case in which a program or data stored in a storage medium is read and executed or processed by the CPU 701, the program or data read from the storage medium is supplied, for example, to the RAM 703, the communication unit 706, or the communication unit 707, connected via the bus 704.

The communication unit 707 is used to make a connection with the Internet to transmit data generated in data processing performed by the CPU 701 or receive a packet via a higher-level router and the Internet. The communication unit 708 is connected to a subnetwork to transmit a packet received from the higher-level router to the lower-level router or a node serving as a communication terminal via the subnetwork.

The parts from the CPU 701 to the communication unit 708 are connected to each other via the bus 704 so that data can be transferred among them.

The present invention has been described in detail above with reference to a number of embodiments. It will be apparent to those skilled in the art that various modifications and substitutions to those embodiments may be made in the embodiment chosen for illustration without departing from the spirit and scope of the invention. That is, the embodiments have been described above by way of examples and not limitations.

Note that processes and methods disclosed herein in the present description may be executed by hardware, software, or a combination of hardware and software. Execution of processes by software may be accomplished by installing a program, in which a sequence of processing steps is described, into a memory disposed in a computer embedded in dedicated hardware, or by installing such a program into a general-purpose computer capable of executing various kinds of processes.

The program may be stored, in advance, in a storage medium such as a hard disk or a ROM (Read Only Memory).

Alternatively, the program may be stored (recorded) temporarily or permanently on a removable storage medium such as a floppy disk, a CD-ROM (Compact Disc Read Only Memory), an MO (Magnetooptical) disk, a DVD (Digital Versatile Disc), a magnetic disk, or a semiconductor memory. Such a removable recording medium may be provided in the form of so-called package software.

Instead of installing the program from such a removable storage medium onto the computer, the program may also be transferred to the computer from a download site by means of radio transmission or by means of cable transmission via a network such as a LAN (Local Area Network) or the Internet. In this case, if the computer receives the program transmitted in such a manner, the computer installs the program on a storage medium such as a hard disk disposed in the computer.

The processes and methods disclosed in the present description may be executed time-sequentially in the same order as processing steps are described in the program, or may be executed in parallel or individually depending on the capacity or capability of an apparatus which executes processes. In the present description, the term "system" is used to describe a logical collection of a plurality of devices, and it is not necessarily required that the plurality of devices are disposed in a single case.

As can be understood from the above description, the present invention has great advantages. That is, when a secure communication between a calling terminal and a called mobile terminal is performed, acquisition of an encryption key shared between the two communication terminals and acquisition of a current location, on a network, of the destination terminal can be performed at the same time, thereby making it possible to efficiently start the secure communication according to the IPsec protocol.

The server has the database in which location information of mobile terminals are stored. If the server receives, from a calling terminal, data designating a destination terminal, the server transmits a query on the basis of the received data designating the destination terminal to the DNS server to acquire a terminal ID of the destination terminal. The server then searches the database to acquire the latest location information of the destination terminal, and transmits data indicating the latest location information of the destination terminal to the calling terminal. This makes it unnecessary for the calling terminal to perform an additional process to acquire the location information of the destination terminal, and thus the process becomes efficient.

Furthermore, in the present invention, private keys corresponding to the respective communication terminals are stored in the database provided in the server, and a session key or address data transmitted to a terminal is encrypted using a private key corresponding to the terminal so that the data can be decrypted only by the specific terminal, thereby ensuring that the data is kept secret.

Furthermore, in the present invention, the server manages the numbers of times common keys (session keys) have been generated and also manages the date/time of generation of the common keys. This makes it possible to calculate charges to users of calling or called terminals on the basis of the data managed by the server.

Furthermore, in the present invention, if a device ID and a private key of a communication terminal are stored in a storage medium (removable memory) or a mobile modem, when the communication terminal is replaced with another communication terminal, it is possible to perform authentication and a secure communication according to the IPsec protocol simply by attaching the mobile modem or the storage medium to the new communication terminal.

Although the present invention has been described with reference to specific embodiments, those of skill in the art will recognize that changes may be made thereto without departing from the spirit and scope of the present invention as set forth in the hereinafter appended claims.

The invention claimed is:

1. A communication processing system for performing a process that allows communication via a network, comprising:
   a communication terminal serving as a calling terminal that starts a call;
   a communication terminal designated as a destination terminal by the calling terminal; and
   a server connected to the network, the server serving to perform a process, the process including the steps of acquiring location information of a mobile terminal designated as the destination terminal and storing the acquired location information in a database in relation to an identifier of the destination terminal; in response to receiving request data, designating the destination terminal from the calling terminal, generating a session key encrypted in said server with at least two different private keys including at least one private key specific to the destination terminal and at least one private key specific to the calling terminal, the session key serving as a common key to be used in a secure communication between the calling terminal and the destination terminal; and providing, to the calling terminal, the generated session key and address information on the basis of the location information of the destination terminal acquired from the database.

2. A communication processing system as claimed in claim 1, wherein each of the communication terminals stores a private key, for use in encryption, in a storage medium that can be used by the communication terminals; the server stores a number of private keys for use in encryption, identical to the private keys stored in the respective communication terminals, in the database in relation to the identifiers of the respective communication terminals; the server transmits both a first encrypted session key and a second encrypted session key to the calling terminal, the first encrypted session key being encrypted with the private key stored in relation to the calling terminal in the database, the second encrypted session key being encrypted with the private key stored in relation to the destination terminal in the database; and the calling terminal transmits, to the destination terminal, the second encrypted session key received from the server, the second encrypted session key being encrypted with the private key corresponding to the destination terminal, thereby making the session key shared by the calling terminal and the destination terminal.

3. A communication processing system as claimed in claim 1, wherein each communication terminal stores a private key for use in encryption, in a storage medium that can be used by the communication terminal; the server stores a number of private keys for use in encryption, identical to the private keys stored in the respective communication terminals, in the database in relation to the identifiers of the respective communication terminals; and the server acquires the location information of a mobile terminal designated as the destination terminal from the database, generates address data of the destination terminal from the acquired location information, encrypts the address data using the private key stored in relation to the calling terminal in the database, and transmits the encrypted address data to the calling terminal.

4. A communication processing system as claimed in claim 1, wherein the server acquires an IP address of the destination terminal in such a manner that if the server has received a name address of the destination terminal from the calling terminal, the server transfers the received name address to a domain name server to acquire the IP address from the domain name server, while the server acquires the IP address without querying the domain name server for the IP address if the server has directly received the IP address of the destination terminal from the calling terminal; and the server searches the database using, as a search key, the identifier of the destination terminal included in the acquired IP address to extract, from the database, current locator information serving as location information corresponding to the identifier of the destination terminal, and the server generates IP address data such that the extracted current locator information is included in the IP address data.

5. A communication processing system as claimed in claim 1, wherein the location information stored in the database is data corresponding to a higher-order 64-bit network prefix address of an IPv6 address.

6. A communication processing system as claimed in claim 1, wherein the communication between the calling terminal and the server is performed on a condition that authentication is successfully passed; and the server provides, to the calling terminal, the session key and the address information based upon of the location information of the destination terminal acquired from the database, on a condition that, at least, the server has successfully authenticated the calling terminal.

7. A communication processing system as claimed in claim 1, wherein the server stores the number of times a session key has been generated and a date/time of generation of the session key, in the database in relation to an identifier of a communication terminal, and the server updates the data when the server generates the session key.

8. A communication processing method of performing a process that allows a communication via a network among a server, a communication terminal serving as a calling terminal that starts a call and a communication terminal designated as a destination terminal by the calling terminal, the method comprising the steps of:
    acquiring location information of a mobile terminal designated as the destination terminal and storing the acquired location information in a database in relation to an identifier of the destination terminal;
    generating, in response to receiving request data designating the destination terminal from the calling terminal, a session key encrypted in said server with at least two different private keys including at least one private key of specific to the destination terminal and at least one private key specific to the calling terminal, the session key serving as a common key to be used in a secure communication between the calling terminal and the destination terminal; and
    providing to the calling terminal, the generated session key and address information on the basis of the location information of the destination terminal acquired from the database.

9. A communication processing method as claimed in claim 8, the method comprising the steps of:
    storing a private key for each of the communication terminals, for use in encryption, in a storage medium that can be used by the communication terminal;
    storing a number of private keys for use in encryption in the server which are identical to the private keys stored in the respective communication terminals, in the database in relation to the identifiers of the respective communication terminals;
    causing the server to transmit both a first encrypted session key and a second encrypted session key to the calling terminal, the first encrypted session key being encrypted with the private key stored in relation to the calling terminal in the database, the first encrypted session key being encrypted with the private key stored in relation to the destination terminal in the database; and
    causing the calling terminal to transmit, to the destination terminal, the second encrypted session key received from the server, the second encrypted session key being encrypted with the private key corresponding to the destination terminal, thereby making the session key shared by the calling terminal and the destination terminal.

10. A communication processing method as claimed in claim 8, the method further comprising the steps of:
    storing a private key for each of the communication terminals, for use in encryption, in a storage medium that can be used by the communication terminal;
    storing a number of private keys for use in encryption, identical to the private keys stored in the respective communication terminals, in the database in relation to the identifiers of the respective communication terminals; and
    causing the server to acquire the location information of a mobile terminal designated as the destination terminal from the database, generates address data of the destination terminal from the acquired location information, encrypts the address data using the private key stored in relation to the calling terminal in the database, and transmits the encrypted address data to the calling terminal.

11. A communication processing method as claimed in claim 8, the method further comprising the steps of:
    causing the server to acquire an IP address of the destination terminal in such a manner that if the server has received a name address of the destination terminal from the calling terminal, the server transfers the received name address to a domain name server to acquire the IP address from the domain name server, while the server acquires the IP address without querying the domain name server for the IP address if the server has directly received the IP address of the destination terminal from the calling terminal; and causing the server to search the database using, as a search key, the identifier of the destination terminal included in the acquired IP address to extract, from the database, current locator information serving as location information corresponding to the identifier of the destination terminal, and the server generates IP address data such that the extracted current locator information is included in the IP address data.

12. A communication processing method as claimed in claim 8, wherein the location information stored in the database is data corresponding to a higher-order 64-bit network prefix address of an IPv6 address.

13. A communication processing method as claimed in claim 8, wherein the communication between the calling terminal and the server is performed on a condition that authentication is successfully passed; and the server provides, to the calling terminal, the session key and the address information based upon the location information of the destination terminal acquired from the database, on a condition that, at least, the server has successfully authenticated the calling terminal.

14. A communication processing method as claimed in claim 8, the method further comprising the step of:
storing the number of times the session key has been generated and a date/time of generation of the session key by the server, in the database in relation to an identifier of a communication terminal, wherein the server updates the data when the server generates the session key.

15. A server for providing a service in a communication via a network between a communication terminal serving as a calling terminal that starts a call and a communication terminal designated as a destination terminal by the calling terminal, the server serving to perform a process, the process including the steps of:
acquiring location information of a mobile terminal designated as the destination terminal and storing the acquired location information in a database in relation to an identifier of the destination terminal;
generating, in response to receiving request data designating the destination terminal from the calling terminal, a session key encrypted in said server with at least two different private keys including at least one private key specific to the destination terminal and at least one private key specific to the calling terminal, the session key serving as a common key to be used in a secure communication between the calling terminal and the destination terminal; and
providing, to the calling terminal, the generated session key and address information on the basis of the location information of the destination terminal acquired from the database.

16. A server as claimed in claim 15, wherein the server stores a number of private keys, for use in encryption, identical to the private keys held by the respective communication terminals in the database in relation to the identifiers of the respective communication terminals, and the server transmits both a first encrypted session key and a second encrypted session key to the calling terminal, the first encrypted session key being encrypted with the private keys stored in relation to the calling terminal in the database, the second encrypted session key being encrypted with the private key stored in relation to the destination terminal in the database.

17. A server as claimed in claim 15, wherein the server stores a number of private keys, for use in encryption, identical to the private keys held by the respective communication terminals in the database in relation to the identifiers of the respective communication terminals, and the server acquires the location information of a mobile terminal designated as the destination terminal from the database, generates address data of the destination terminal from the acquired location information, encrypts the address data using the private key stored in relation to the calling terminal in the database, and transmits the encrypted address data to the calling terminal.

18. A server as claimed in claim 15, wherein the server acquires an IP address of the destination terminal in such a manner that if the server has received a name address of the destination terminal from the calling terminal, the server transfer the received name address to a domain name server to acquire the IP address from the domain name server, while the server acquires the IP address without querying the domain name server for the IP address if the server has directly received the IP address of the destination terminal from the calling terminal, and the server searches the database using, as a search key, the identifier of the destination terminal included in the acquired IP address to extract, from the database, current locator information serving as location information corresponding to the identifier of the destination terminal, and the server generates IP address data such that the extracted current locator information is included in the IP address data.

19. A server as claimed in claim 15, wherein the location information stored in the database is data corresponding to a higher-order 64-bit network prefix address of an IPv6 address.

20. A server as claimed in claim 15, wherein the server provides, to the calling terminal, the session key and the address information based upon the location information of the destination terminal acquired from the database, on a condition that, at least, the server has successfully authenticated the calling terminal.

21. A server according to claim 15, wherein the server stores the number of times a session key has been generated and a date/time of generation of the session key, in the database in relation to an identifier of a communication terminal, and the server updates the data when the server generates the session key.

22. A computer program including a computer-readable medium containing instruction that when executed perform steps for causing a computer system to execute a communication process between communication terminals via a network, the steps comprising:
generating, in response to receiving request data designating a destination terminal from a calling terminal, a session key encrypted in said server with at least two different private keys including at least one private key specific to the destination terminal and at least one private key specific to the calling terminal, the session key serving as a common key to be used in a secure communication between the calling terminal and the destination terminal;
acquiring location information of a mobile terminal designated as the destination terminal from a database in which the location information is stored in relation to an identifier of the destination terminal, and generating address information of the destination terminal on the basis of the acquired location information; and transmitting the session key and the address information of the destination terminal to the calling terminal.

23. A communication processing method as claimed in claim 8, further comprising:

providing the session key encrypted with the private key specific to the destination terminal to the destination terminal; and providing the session key encrypted with the private key specific to the calling terminal to the calling terminal.

24. A server as claimed in claim 15, further performing the steps of:

providing the session key encrypted with the private key specific to the destination terminal to the destination terminal; and providing the session key encrypted with the private key specific to the calling terminal to the calling terminal.

25. A computer program as claimed in claim 22, further performing the steps of:

providing the session key encrypted with the private key specific to the destination terminal to the destination terminal; and providing the session key encrypted with the private key specific to the calling terminal to the calling terminal.

* * * * *